United States Patent
Caldwell et al.

(10) Patent No.: US 10,180,135 B2
(45) Date of Patent: Jan. 15, 2019

(54) INDUSTRIAL SYSTEM WITH SYNTHETICALLY COMMUTATED VARIABLE DISPLACEMENT FLUID WORKING MACHINE

(71) Applicant: Artemis Intelligent Power Limited, Midlothian (GB)

(72) Inventors: Niall James Caldwell, Midlothian (GB); Jeremy Edmondson, Midlothian (GB); Alasdair Ian Fletcher Robertson, Midlothian (GB); Uwe Bernhard Pascal Stein, Midlothian (GB)

(73) Assignee: ARTEMIS INTELLIGENT POWER LIMITED, Midlothian (GB)

( * ) Notice: Subject to any disclaimer, the term of this patent is extended or adjusted under 35 U.S.C. 154(b) by 167 days.

(21) Appl. No.: 15/507,964

(22) PCT Filed: Sep. 30, 2015

(86) PCT No.: PCT/GB2015/052858
§ 371 (c)(1),
(2) Date: Mar. 1, 2017

(87) PCT Pub. No.: WO2016/051172
PCT Pub. Date: Apr. 7, 2016

(65) Prior Publication Data
US 2017/0284388 A1    Oct. 5, 2017

(30) Foreign Application Priority Data
Sep. 30, 2014 (GB) .................................. 1417293.6

(51) Int. Cl.
*F04B 49/22* (2006.01)
*F04B 1/06* (2006.01)
(Continued)

(52) U.S. Cl.
CPC ................ *F04B 49/22* (2013.01); *F03C 1/26* (2013.01); *F04B 1/06* (2013.01); *F04B 1/063* (2013.01);
(Continued)

(58) Field of Classification Search
CPC .................. F15B 11/0426; F15B 21/14; F15B 2211/20569; F04B 49/22
See application file for complete search history.

(56) References Cited

U.S. PATENT DOCUMENTS

| 3,989,117 A | 11/1976 | Hill |
| 4,470,771 A | 9/1984 | Hall et al. |

(Continued)

FOREIGN PATENT DOCUMENTS

| CA | 605046 | 9/1960 |
| DE | 2706091 | 8/1978 |

(Continued)

OTHER PUBLICATIONS

International Search Report for corresponding International PCT Application No. PCT/GB2015/052858.
(Continued)

*Primary Examiner* — Thomas E Lazo
(74) *Attorney, Agent, or Firm* — Hauptman Ham, LLP

(57) ABSTRACT

An injection molding system, water jet cutting machine or other industrial system has a synthetically controlled variable displacement fluid working machine which outputs hydraulic fluid to one or more fluid consumers, such as rams or hydraulic motors, through hydraulically stiff fluid retaining volumes and receives hydraulic fluid back from one or more fluid consumers through the same or other said hydraulically stiff fluid retaining volumes. Individual piston cylinder assemblies can be allocated to different outputs. There may be no valve between the machine and the consumers. A (Continued)

working chamber of the machine can be caused to undergo a motoring cycle to enable the machine to output more power than is received from a motor driving the machine. An accumulator can be used to provide a source of hydraulic compliance. The machine can be controlled using pressure control, flow control, feed forward control or variable power/variable power limit control.

28 Claims, 18 Drawing Sheets

(51) Int. Cl.
F03C 1/26 (2006.01)
F15B 7/00 (2006.01)
F15B 11/042 (2006.01)
F15B 21/14 (2006.01)

(52) U.S. Cl.
CPC .............. *F04B 49/225* (2013.01); *F15B 7/00* (2013.01); *F15B 7/006* (2013.01); *F15B 11/0426* (2013.01); *F15B 21/14* (2013.01); F15B 2211/2053 (2013.01); F15B 2211/20569 (2013.01); F15B 2211/20576 (2013.01); F15B 2211/212 (2013.01); F15B 2211/214 (2013.01); F15B 2211/27 (2013.01); F15B 2211/30505 (2013.01); F15B 2211/327 (2013.01); F15B 2211/633 (2013.01); F15B 2211/6651 (2013.01); F15B 2211/6654 (2013.01); F15B 2211/7052 (2013.01); F15B 2211/7053 (2013.01); Y02P 80/13 (2015.11)

(56) References Cited

U.S. PATENT DOCUMENTS

| | | | |
|---|---|---|---|
| 4,819,429 A | 4/1989 | Kordak | |
| 5,020,826 A | 6/1991 | Stecklein et al. | |
| 5,093,052 A | 3/1992 | Wurl et al. | |
| 5,179,836 A | 1/1993 | Dantlgraber | |
| 5,182,909 A | 2/1993 | Stellwagen | |
| 5,190,446 A | 3/1993 | Salter et al. | |
| 5,259,738 A | 11/1993 | Salter et al. | |
| 5,513,971 A | 5/1996 | Nakamura et al. | |
| 6,068,810 A | 5/2000 | Kestle et al. | |
| 6,200,123 B1 | 3/2001 | Mailliet et al. | |
| 6,257,859 B1 | 7/2001 | Koda et al. | |
| 6,289,259 B1 | 9/2001 | Schad | |
| 6,341,953 B1 | 1/2002 | Okubo et al. | |
| 6,477,835 B1 | 11/2002 | Geiger | |
| 6,478,572 B1 | 11/2002 | Schad | |
| 6,527,540 B1 | 3/2003 | Dantlgraber | |
| 6,557,344 B1 | 5/2003 | Püschel | |
| 6,655,362 B2* | 12/2003 | Rembold ............. | F02M 59/102 123/459 |
| 6,814,908 B2 | 11/2004 | Marazita | |
| 6,868,305 B2 | 3/2005 | Choi et al. | |
| 6,912,849 B2 | 7/2005 | Komatsu | |
| 7,168,944 B2 | 1/2007 | Schad | |
| 7,519,450 B2 | 4/2009 | Schad | |
| 7,543,449 B2 | 6/2009 | Ivantysynova et al. | |
| 7,824,164 B2 | 11/2010 | Hakoda et al. | |
| 7,846,358 B2 | 12/2010 | Shimizu et al. | |
| 7,866,970 B2 | 1/2011 | Hakoda et al. | |
| 7,896,637 B2 | 3/2011 | Yamaura et al. | |
| 7,938,994 B2 | 5/2011 | Tanemura et al. | |
| 8,191,290 B2 | 6/2012 | Hughes, IV et al. | |
| 8,192,175 B2* | 6/2012 | Kuttler ............... | F04B 7/0076 417/290 |
| 8,429,907 B2 | 4/2013 | Gronli | |
| 8,635,939 B2 | 1/2014 | Linjama et al. | |
| 8,641,399 B2 | 2/2014 | Mucibabic et al. | |
| 8,668,465 B2* | 3/2014 | Wadsley ............... | F04B 1/28 417/216 |
| 8,905,732 B2* | 12/2014 | Kuttler ............... | F04B 7/0076 417/505 |
| 9,010,104 B2* | 4/2015 | Rampen ............... | F04B 49/22 60/459 |
| 9,091,253 B2* | 7/2015 | Stein ............... | F01B 15/06 |
| 9,133,839 B2* | 9/2015 | Rampen ............... | F04B 7/0076 |
| 9,188,114 B2* | 11/2015 | Kuttler ............... | F04B 1/145 |
| 9,797,252 B2* | 10/2017 | Stein ............... | F04B 39/10 |
| 2003/0037545 A1 | 2/2003 | Sheinbein et al. | |
| 2003/0110765 A1 | 6/2003 | Bailey et al. | |
| 2008/0089964 A1 | 4/2008 | Kianpour et al. | |
| 2011/0123354 A1 | 5/2011 | Stein et al. | |
| 2011/0226342 A1* | 9/2011 | Stein ............... | F01B 15/06 137/2 |
| 2012/0260644 A1 | 10/2012 | Kadlicko et al. | |
| 2013/0309350 A1 | 11/2013 | Ikeda et al. | |
| 2014/0083092 A1 | 3/2014 | Son et al. | |

FOREIGN PATENT DOCUMENTS

| | | |
|---|---|---|
| EP | 0361927 | 4/1990 |
| EP | 0494236 | 12/1995 |
| EP | 0777055 | 6/1997 |
| EP | 1186783 | 3/2002 |
| EP | 1537333 | 6/2006 |
| EP | 2557239 | 2/2013 |
| EP | 2644903 | 10/2013 |
| EP | 2307721 | 10/2014 |
| GB | HY11-3500 | 1/2008 |
| JP | 2820851 | 11/1998 |
| WO | 9105163 | 4/1991 |
| WO | 2004/025122 | 3/2004 |
| WO | 2009 153605 | 12/2009 |
| WO | 2010124708 | 11/2010 |
| WO | 2013 118180 | 8/2013 |

OTHER PUBLICATIONS

Zhongyi Quan, Long Quan, Jinman Zhang, 'Review of energy efficient direct pump controlled cylinder electro-hydraulic technology' Renewable and Sustainable Energy Reviews 35 (2014) 336-346 (Elsevier).

* cited by examiner

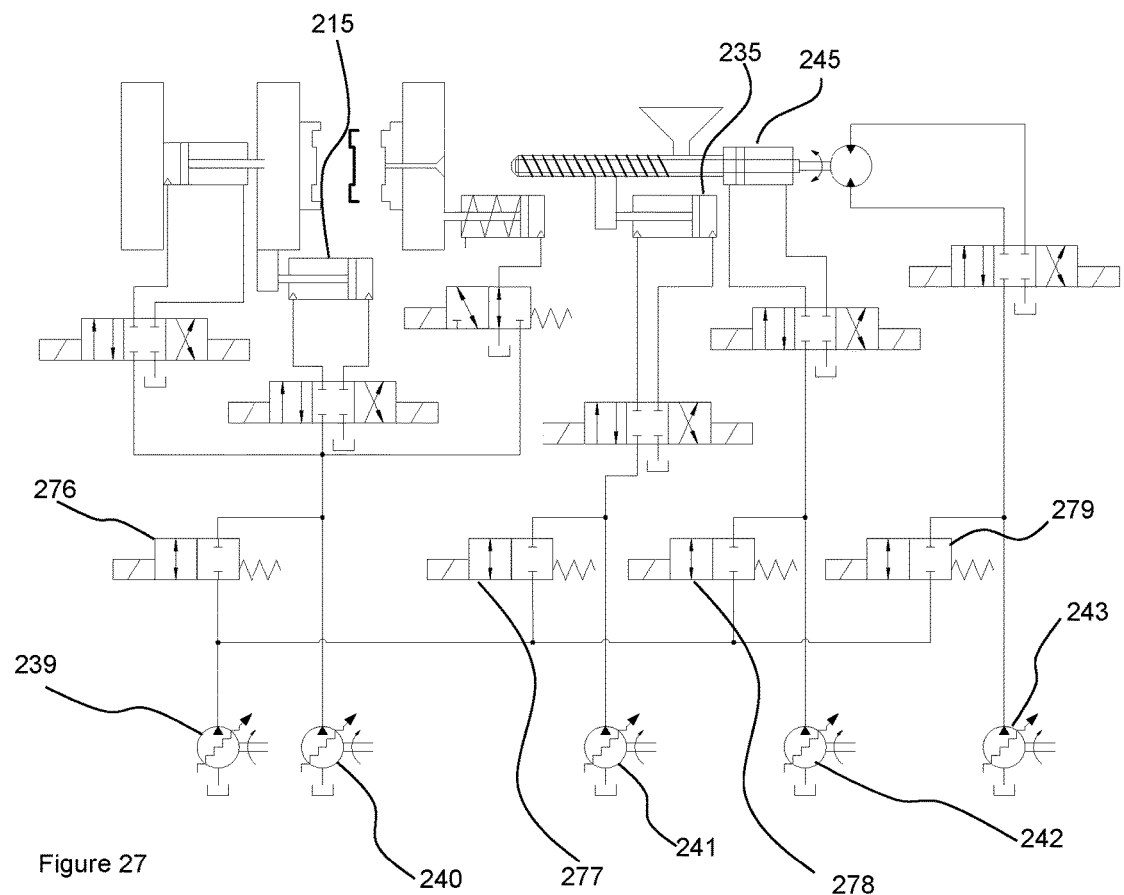
Figure 27
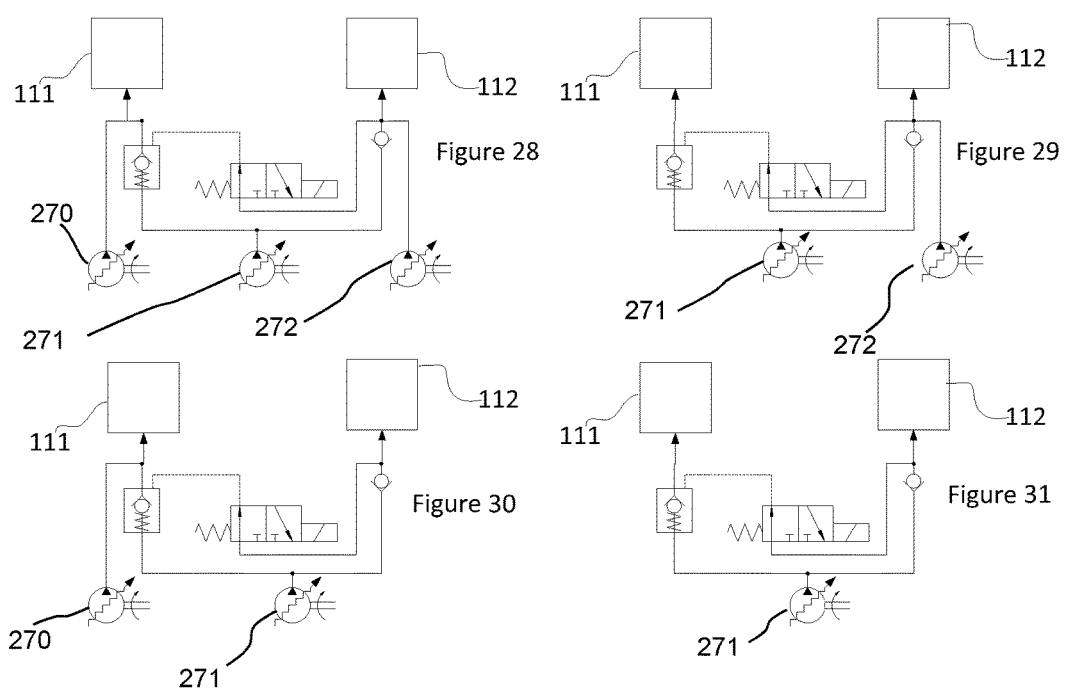
Figure 28
Figure 29
Figure 30
Figure 31

INDUSTRIAL SYSTEM WITH SYNTHETICALLY COMMUTATED VARIABLE DISPLACEMENT FLUID WORKING MACHINE

FIELD OF THE INVENTION

The invention relates to variable displacement fluid working machines (for example radial piston). The invention is of especial relevance to fluid working machines for use in hydraulically stiff industrial systems. The industrial system may be an industrial machine to carry out industrial processes, typically understood to relate to a non-mobile applications. Examples of such systems include injection moulding machines (e.g. plastic), die casting, shredding systems using rotating shear, hydraulic ring mains, drive pulley conveyors, balers, rubber moulding, sheet extruders, mud or grout pumps, crushers, concrete block machines, compressor drives, large rotating element power plant starting, various food processing machines, industrial presses, forging presses, industrial rollers, industrial rolling machines/system, high pressure water sources such as water jet cutting machines and water cleaning machines. Any number of machines may benefit from a form of direct actuation. Industrial power packs (also known as hydraulic power units—HPUs) may also require hydraulic machines according to the present invention. Additionally aircraft systems, such as using the invention for powering control surfaces, are also seen as a relevant application area.

BACKGROUND TO THE INVENTION

The invention relates to synthetically commutated variable displacement pumps in which individual cylinders are electronically commutated and their displacement is selected by a controller. Such pumps are for example sold under the names Digital Displacement® Pump or DDP® pump. The electronic valves (14,18,24) on each cylinder (4) can be controlled such that, for every cycle the piston (6) reciprocates, the volume of fluid pumped can be controlled (so called synthetic commutation/synthetically commutated pump/and further below a synthetically commutated pump/motor). Each of these is an example of an electronically controlled displacement selecting machine. Each cylinder (4) can be viewed as an independent pump and is controlled independently. By combining the output of the cylinders in groups, a service is created. If all cylinders in the pump are combined a single service is created. For example, a synthetically commutated pump with 12 cylinders all combined to a single service will have very high dynamic range of flow output and very low output pressure pulsation. This same pump can have the output of the cylinders arranged such that it has 4 services with 3 cylinders each, or in any other combination. These cylinders may or may not all be on the same eccentric but would ideally be equally spaced in terms of the mechanical angle between the cylinders. These 4 services are completely independent even though they are packaged within the same pump. Defining the number of services is a matter of creating the galleries to interconnect the desired cylinders and defining the interconnections in the control software. This creation of services is not as obvious as with typical swash plate, vane, and gear pumps as there may not be any obvious separation between the services. For example a service can be made up of cylinders on different eccentrics or even from a pump in another housing. An eccentric may be driving cylinders where each cylinder provides flow to a different service. The standard definition of a physical pump and output becomes blurred very quickly.

The synthetically commutated pump can also be configured to not only pump but also to motor the pressure energy from the hydraulic output back into the crankshaft (8). This is referred to as a Digital Displacement® Pump/motor or DDPM™ or a synthetically commutated pump/motor.

The concept of hydraulic stiffness: "

A "hard" hydraulic fluid (high bulk module) transmits pressures very fast and leads to a stiff hydraulic system. This is appreciated in closed loop controlled systems. "Stiff" systems are achieved by small pressurized volumes, hard surrounding walls (pipes instead of flexible hoses) and high viscose fluids. Beside that pressure increases the bulk module of mineral oil. A "soft" hydraulic system is more subject to instability, but it is in general quieter, because high frequent pressure ripple is damped better "(Catalogue HY14-3200/US, Parker Hannifin Corporation)

Hydraulic compliance in this context refers to the compressibility of the working fluid, but primarily to the containment of the fluid; e.g. hoses (any part of containment with flexible walls) will expand when fluid pressure increases, allowing an increase in volume of liquid stored. Similarly, hydraulic accumulators provide intentionally large amounts of compliance. A simple open tank exhibits compliance, since an increase in volume of contained liquid results in a pressure increase due to gravity. Bubbles within the working fluid will also provide compliance. Compliance in a fluid drive system changes the dynamic response when trying to control the system. The term 'hydraulic compliance' is not limited to the bulk modulus of the working fluid and the walls containing and constraining that volume, and is meant to encompass the effect of stiffness of components directly influencing the characteristics and compressibility of the hydraulic volume. However, the bulk modulus alone may represent a significant compliance. For example, in another fluid system the fluid alone may compress by about 1.5% volume at 2,000 psi, about 3% volume at 5,000 psi, and about 6% volume at 10,000 psi. Another metric used for compliance is the amount of fluid that is swept by a fluid machine piston stroke in relation to the system volume. If the relative swept volume is small, then many strokes are needed to raise the system pressure from low pressure to high or working pressure. If the relative swept volume is large, then few strokes are needed to raise the system pressure from low to high or working pressure. It is considered that a system requiring 5 or fewer fluid machine piston strokes to raise system pressure to working or high pressure is a hydraulically stiff system. Therefore by definition a system requiring 6 or more fluid machine piston strokes to raise system pressure to working or high pressure, is a hydraulically soft one. The compliance of the system is influenced by the compressibility of the working fluid which may be affected by the fluid type, fluid temperature, fluid air content/aeration, age of the fluid, and other factors obvious to one skilled in the art. The compliance of the system is similarly influenced by the constraint of the system holding the fluid which may be affected by similar factors, for example the ambient (atmospheric) pressure. The consumer state influences system compliance, and a prime example is the extension of a ram which increases the system volume and increases the exposed area of the containment/constraining walls, thus increasing the compliance.

Fluid working machines include fluid-driven and/or fluid-driving machines, such as pumps, motors, and machines which can function as either a pump or as a motor in different operating modes.

When a fluid working machine operates as a pump, at least one low pressure manifold (16, 26) typically acts as a net source of fluid and a high pressure manifold (20) typically acts as a net sink for fluid. When a fluid working machine operates as a motor, a high pressure manifold (20) typically acts as a net source of fluid and at least one low pressure manifold (16,26) typically acts as a net sink for fluid. Within this description and the appended claims, the terms "high pressure manifold" and "low pressure manifold" are relative, with the relative pressures being determined by the application. In some embodiments of the present invention the pressure within the at least one low pressure manifold (16,26) is significantly higher than atmospheric pressure, for example, several atmospheres, however, it will be less than the pressure in the high pressure manifold (20) during normal operation. A fluid working machine may have more than one low pressure manifold (16, 26) and more than one high pressure manifold (20).

In systems with a single pump and multiple actuators there is always undesirable compromise given the practical impossibility of matching the instantaneous pressure requirements of all of the active actuators to the single pressure supply.

In the case of the state-of-the-art "load sensing" system, the displacement of a variable displacement pump is controlled such as to maintain its output pressure to a fixed margin above the maximum pressure required of any of the loads. The difference between this pressure and the actual pressure required of any one of the loads is throttled in a proportional valve, creating energy losses. When only one actuator is moved at a time these systems can be reasonably efficient. However when multiple actuators must be moved simultaneously at different pressures then the efficiency becomes poor—depending on the duty cycle, these losses can cause the overall efficiency of such a system to reduce to 30%.

The pump/motor described in EP 0494236 B1 (Artemis Intelligent Power Ltd) and sold under the trade mark Digital Displacement® is a positive-displacement fluid pump/motor in which the working volumes are commutated not by mechanical means but by electronically-controlled solenoid-actuated poppet valves (so called synthetic commutation of a pump/motor, or synthetically commutated pump/motor). Control of flow is achieved by varying the time-averaged proportion of working volumes which are commutated such as to pump fluid from the low pressure port to the high pressure port ("pump enabled"), or which are commutated such as to motor fluid from the high pressure port to the low pressure port ("motor enabled"), to the proportion which are connected in both expansion and contraction strokes to the low pressure port and thus do no fluid work ("idled"). A controller, synchronised to the position of the shaft by means of a position sensor, supplies pulses to the solenoid coils at the appropriate times such as to commutate each working volume as desired. Because the commutation of each stroke of the working volume is independently controllable, the pump/motor is capable of supplying fluid to or absorbing fluid from a port, in individual discrete volume units, each corresponding to a single stroke or part of a stroke (see WO 2004/025122) of a single working volume. The high pressure port of each working volume may be connected to a different fluid circuit. Thus a single pump/motor composed of many working volumes may provide multiple independent fluid supplies or sinks, the flow to or from each of which is independently variable.

By way of background art, U.S. Pat. No. 7,543,449 B2 (Cnh America Llc, Ivantysynova et al.) introduces, and discloses the term 'displacement control', and includes explanatory passage: " . . . displacement-controlled systems are used in which an adjustable pump that is variable in its displacement volume is used for the control or regulation of the motion of the hydraulic motor(s). The consumer is hence controlled only via the volume flow provided by the pump, without the use of a control valve or similar device in the main circuit." So, a variable displacement pump is used to control the motion of a hydraulic motor. There is no additional control valve/similar.

SUMMARY OF THE INVENTION

According to a first aspect of the invention there is provided an industrial system comprising:
 a hydraulic fluid working machine, a controller for controlling the at least one fluid working machine, at least one fluid consumer and a hydraulic circuit,
 the fluid working machine comprising a plurality of working chambers of cyclically varying volume, a rotatable shaft which rotates in phase with the cyclically varying volume of the plurality of working chambers, each said working chamber operable to displace a volume of working fluid which is selectable by the controller on each cycle of working chamber volume,
 wherein the hydraulic circuit comprises at least first and second fluid retaining bodies,
 wherein the fluid circuit directs hydraulic fluid outputted from the fluid working machine to at least one said fluid consumer via the first or second fluid retaining body, and further directs hydraulic fluid from at least one said fluid consumer to the machine via the first or the second fluid retaining body, characterised in that
 the machine is operable in a pumping mode to supply energy in the form of pressurised fluid flow to at least one said fluid consumer via one of the fluid retaining bodies in order that at least one said fluid consumer may perform work, and the machine is also operable in a regeneration mode operating as a motor such that it receives energy by way of pressurised fluid flow from at least one said fluid consumer via one of the fluid retaining bodies and converts it to fluid working machine shaft torque.

The fluid circuit typically extends between the fluid working machine and the fluid consumer, and may include the fluid path extending between the consumer and the fluid tank, 'through' the tank, and extending between the tank and the fluid working machine.

The fluid consumer from which the fluid working machine receives pressurised working fluid in the regeneration mode may be the same or a different fluid consumer to the fluid consumer to which the fluid working machine supplies pressurised working fluid in the pumping mode. The fluid working machine controller may be programmed to operate the fluid working machine in either the pumping mode or the regeneration mode and to switch between the two.

The fluid working machine may comprise a plurality of manifolds (e.g. a low pressure manifold and a high pressure manifold), and a plurality of valves which regulate the flow of working fluid between the manifolds and the working chambers (e.g. a plurality of low pressure valves which regulate the flow of fluid between the low pressure manifold and the working chambers and a plurality of high pressure valves which regulate the flow of fluid between the high pressure manifold and the working chambers). It may be that at least one valve associated with each working chamber is an electronically controlled valve and the controller controls the electronically controlled valves in phased relation to cycles of cylinder working volume to select the net displacement by each working chamber during each cycle of working chamber volume.

It may be that at least one of the fluid retaining bodies (typically at least one of the fluid retaining bodies through which pressurised hydraulic fluid is directed from the fluid working machine to supply power to the fluid consumer or vice versa) is hydraulically stiff. For example, it may be that the volume of the said at least one fluid retaining body changes, when varying flow between zero flow and operating pressure or high pressure flow either by less than 2%, or the required number of machine piston stroke cycles producing a variation in flow between zero flow and operating pressure or high pressure flow is less than or equal to five.

The machine may have at least two fluid outputs, whereby the piston cylinder assemblies which provide the drive mechanism of the machine may be dynamically allocated to the fluid outputs such that the fraction of assemblies allocated to each output may be varied during machine operation.

It may be that there is no valve hydraulically intermediate the fluid working machine and one or more said fluid consumer, which would otherwise function to check and/or divert flow, and there is no cross line relief between portions of the circuit.

The industrial system may further comprise at least one additional fluid working machine comprising a plurality of working chambers of cyclically varying volume, a rotatable shaft which rotates in phase with the cyclically varying volume of the plurality of working chambers, each said working chamber operable to displace a volume of working fluid which is selectable by a controller on each cycle of working chamber volume, wherein the fluid working machine and the additional fluid working machine are in fluid communication with different fluid consumers.

The industrial system may comprise an additional valve located within the circuit to isolate the fluid volumes, where the valve may switch to a position which checks the flow of fluid through at least one of the two fluid volumes.

It may be that at least one said consumer is a ram, or a hydraulic motor.

The machine may be a synthetically commutated pump-motor that may function as a pump and/or a motor.

The machine may additionally comprise working chambers which are mechanically commutated. A check valve pump is a typical example of a machine with working chambers which are mechanically commutated.

It may be that the torque arising from at least two cylinders in the machine is mutually supportive. It may be that the torque arising from at least two cylinders in the machine is subtractive.

It may be that the fluid working machine is driven by a motor and the controller is programmed to selectively cause at least one working chamber of the fluid working machine to carry out a motoring cycle to enable the power output of the fluid working machine to thereby exceed the power received by the fluid working machine from the motor.

The said motoring cycle may be carried out using working fluid received from at least one accumulator.

Said at least one accumulator may be used as a flow buffer or smoothing device at other times of the cycle (e.g. motoring cycle, pumping cycle, idle cycle). It may be that said at least one accumulator is isolatable from other fluid consumers when said motoring cycles are carried out. It may be that said at least one accumulator or other fluid consumers can be supplied with working fluid by performing pumping of at least one working chamber of the fluid working machine.

A hydraulic accumulator may be fluidly connected or (typically selectively) connectable to at least one said fluid retaining bodies between the machine and the consumer, in order to (optionally selectively) provide a source of hydraulic compliance.

The industrial system may further comprise a plurality of manifolds. The machine may comprise a plurality of valves, each of which is operable to regulate the flow of fluid between a working chamber of the machine and at least one of the manifolds.

The industrial system may be an injection moulding machine.

It may that at least one said fluid consumer is a motor configured to rotate a screw member in a barrel for injecting moulding material into a mould cavity.

It may be that the consumer is a ram configured to actuate a clamp unit for supporting first and second sections of a mould selectively movable from a parted position in which said mould sections are opened to a moulded position in which the mould sections are closed to define said mould cavity therebetween.

The ram may also maintain said clamp in said moulded position, typically with a predetermined closing force.

It may be that the fluid consumer is coupled to said injection unit for translating said screw in a barrel pursuant to a variable translate command signal.

It may be that the fluid consumer is an ejection ram, injection unit translating ram or rotating motor, tie-bar clamp ram, or any hydraulic consumer in the function of an injection moulding system.

The industrial system may be a water jet cutting machine.

The water jet cutting machine may comprise at least two fluid working machines and at least two said fluid consumers may be pressure intensifiers (451, 452) with ganged outputs. It may be that one fluid machine output is commanded to return one pressure intensifier piston at a greater speed than the other next-in-phase pressure intensifier piston is extended. It may be that towards the end of the stroke of one intensifier, as it slows down the next-in-phase intensifier starts to move, thus taking over as the dominant contributor to the ganged flow in order to maintain constant flow. Typically, the returning intensifier must return and start moving before the other intensifier is at the end of its stroke. At least one said fluid consumer may be a pressure intensifier.

The invention extends in a second aspect to a kit of parts which can be assembled to form an industrial system according to the first aspect of the invention.

The invention extends in a third aspect to a method of controlling an industrial system according to the first aspect of the invention, where pressure control of the machine, or flow control of the machine, or feed forward control of the machine, or variable power control or variable power limit control of the fluid working machine is used.

DESCRIPTION OF THE DRAWINGS

FIG. 27. Is an injection moulding machine hydraulic circuit, utilising five synthetically commutated pumps;

FIG. 28. Is a portion of an injection moulding machine but enabling services to switch between loads;

FIG. 29. Is a portion of an injection moulding machine but enabling services to switch between loads;

FIG. 30. Is a portion of an injection moulding machine but enabling services to switch between loads;

FIG. 31. Is a portion of an injection moulding machine allowing the system to switch the pressure to the loads;

DETAILED DESCRIPTION OF AN EXAMPLE EMBODIMENT

An example embodiment of the invention will now be described with reference to various industrial systems which employ a synthetically controlled pump as a fluid working machine. However, fluid working machines according to the invention may be used for numerous alternative applications. One aspect that binds these various industrial systems together is the presence of a fluid consumer or load, which are used interchangeably. The terms 'fluid consumer' or 'load' are meant to encompass a range of system components which obtain fluid from the system. Typically these will act as a 'sink' which takes-in fluid, and outputs at a reduced flowrate and/or pressure. It is important to note that the flow related to the fluid consumer is not solely intake flow. During alternate periods, the fluid consumer or load may act more as a fluid convertor in which case the flowrate and/or pressure may be increased as a result of the presence of the fluid consumer or load. Furthermore, the fluid consumer or load may act in an alternate mode, where a port previously functioning as an inlet becomes an outlet, and the consumer or load switches instead to a 'fluid provider' (equivalent to a 'fluid source' mode). Specifically a fluid accumulator will function in one of these two modes, or in a stable mode where no fluid enters/leaves. Also, a ram/cylinder (also known as an electro-hydrostatic actuator) will function in the same way (static state, fluid intake, and fluid outlet modes). This explanation seeks to highlight that whilst 'fluid consumer' or 'load' suggests extraction of energy, there are times when the fluid consumer or load actually provides energy to the system. Examples of 'fluid consumers' or 'loads' include, but are not limited to: fluid motor, fluid pump, hydraulic accumulator, any component which may be attached to the circuit which provides hydraulic compliance, hydraulic actuator, single acting ram, double acting ram, back to back pair of single acting rams, and rotary actuators. In the context of an accumulator being a load, then the accumulator may be said to perform work when the compliant region within the accumulator body is compressed (acts as energy store). Typically in a bladder accumulator, as the input pressure rises the inert gas volume within the bladder is reduced, thus constituting a form of work. The abovementioned fluid circuit directs hydraulic fluid between the fluid working machine and consumer via fluid retaining bodies, for example stiff pipes. The fluid circuit directs hydraulic fluid between the fluid working machine via a first fluid retaining body (101) or second fluid retaining body (102), and further directs hydraulic fluid from at least one said fluid consumer to the machine via the first fluid retaining body (101) or second fluid retaining body (102).

Figure 1:
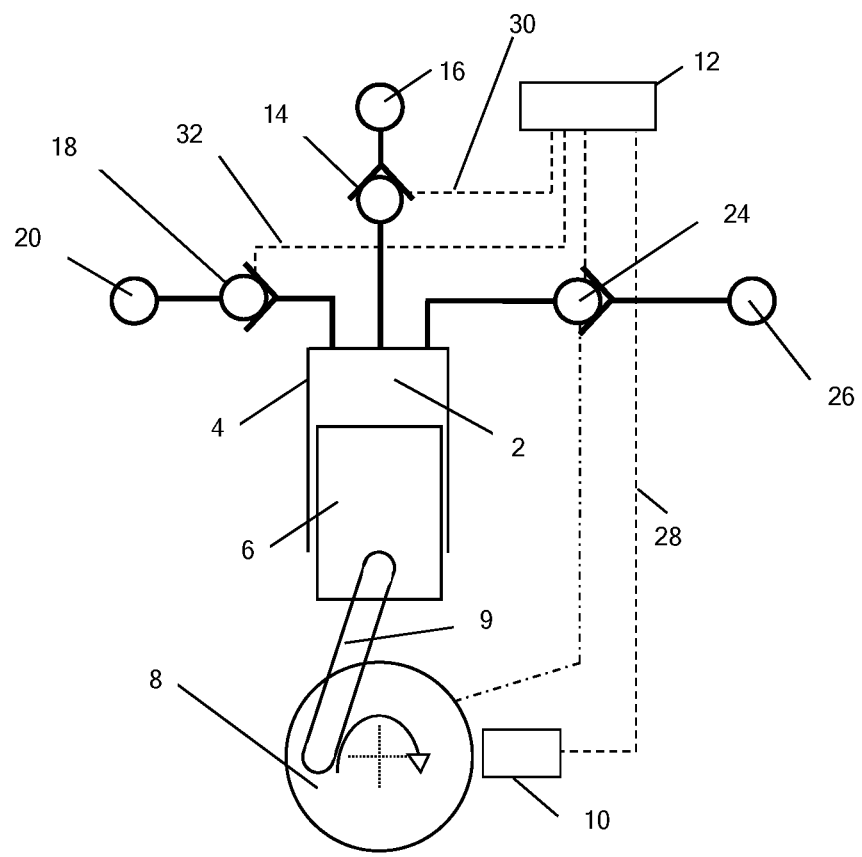
FIG. 1. Is a schematic diagram of an individual working chamber of a fluid working machine.

FIG. 1 illustrates a fluid working machine in schematic form, with suitable control apparatus (12). An individual working chamber (2) has a volume defined by the interior surface of cylinder (4) and piston (6) which is driven from the rotating eccentric by way of a connecting rod (9) and which reciprocates within the cylinder to cyclically vary the volume of the working chamber. A shaft position and speed sensor (10) determines the instantaneous angular position and speed of rotation of the shaft, and informs a controller, by way of electrical connection (28), which enables the controller to determine the instantaneous phase of the cycles of each individual working chamber (2). The controller (12) is typically a microprocessor or microcontroller which executes a stored program in use. FIG. 1 shows a single working chamber but typically a plurality of working chambers are provided which are driven by the same rotating shaft. They may be spaced apart along the length of the rotating shaft with one or more driven by each of a plurality of eccentrics.

The working chamber comprises a low pressure valve (LPV) in the form of an electronically actuatable face-sealing poppet valve (14,24) which faces inwards toward the working chamber and is operable to selectively seal off a channel extending from the working chamber to a low pressure manifold, which functions generally (in the pumping mode) as a net source of fluid in use (or sink in the case of motoring). The LPV is a normally open solenoid closed valve which opens passively when the pressure within the working chamber is less than the pressure within the low pressure manifold, during an intake stroke, to bring the working chamber into fluid communication with the first low pressure manifold, but is selectively closable under the active control of the controller via a LPV control line to bring the working chamber out of fluid communication with the low pressure manifold. Alternative electronically controllable valves may be employed, such as normally closed solenoid opened valves.

The working chamber further comprises a high pressure valve (HPV) (18) in the form of a pressure actuated delivery valve. The HPV faces outwards from the working chamber and is operable to seal off a channel extending from the working chamber to a high pressure manifold, which functions as a net source or sink of fluid in use. The HPV functions as a normally-closed pressuring-opening check valve which opens passively when the pressure within the working chamber exceeds the pressure within the high pressure manifold. The HPV may also function as a normally-closed solenoid opened check valve which the controller may selectively hold open via a HPV control line once the HPV is opened by pressure within the working chamber. The HPV may be openable under the control of the controller when there is pressure in the high pressure manifold but not in the working chamber, or may be partially openable.

At least the low pressure valve is actively controlled so that the controller can select whether the low pressure valve is actively closed, or in some embodiments, actively held open, during each cycle of working chamber volume. In some embodiments, the high pressure valve is actively controlled and in some embodiments, the high pressure valve is a passively controlled valve, for example, a pressure delivery check valve.

The fluid-working machine may be a pump, which carries out pumping cycles (and thereby supplies energy by way of pressurised fluid flow), or a motor which carries out motoring cycles, or a pump-motor which is operable in a pumping or a motoring mode and can thereby carry out pumping or motoring cycles.

A full stroke pumping cycle is described in EP 0 361 927. During an expansion stoke of a working chamber, the low pressure valve is open and hydraulic fluid is received from the low pressure manifold. At or around bottom dead centre, the controller determines whether or not the low pressure valve should be closed. If the low pressure valve is closed, fluid within the working chamber is pressurized and vented to the high pressure valve during the subsequent contraction phase of working chamber volume, so that a pumping cycle occurs and a volume of fluid is displaced to the high pressure manifold. The low pressure valve then opens again at or shortly after top dead centre. If the low pressure valve remains open, fluid within the working chamber is vented back to the low pressure manifold and an idle cycle occurs, in which there is no net displacement of fluid to the high pressure manifold.

In some embodiments, the low pressure valve will be biased open and will need to be actively closed by the controller if a pumping cycle is selected. In other embodiments, the low pressure valve will be biased closed and will need to be actively held open by the controller if an idle cycle is selected. The high pressure valve may be actively controlled, or may be a passively opening check valve.

A full stroke motoring cycle is described in EP 0 494 236. During a contraction stroke, fluid is vented to the low pressure manifold through the low pressure valve. An idle cycle can be selected by the controller in which case the low pressure valve remains open. However, if a full stroke motoring cycle is selected, the low pressure valve is closed before top dead centre, causing pressure to build up within the working chamber as it continues to reduce in volume. Once sufficient pressure has been built up, the high pressure valve can be opened, typically just after top dead centre, and fluid flows into the working chamber from the high pressure manifold. Shortly before bottom dead centre, the high pressure valve is actively closed, whereupon pressure within the working chamber falls, enabling the low pressure valve to open around or shortly after bottom dead centre.

In some embodiments, the low pressure valve will be biased open and will need to be actively closed by the controller if a motoring cycle is selected. In other embodiments, the low pressure valve will be biased closed and will need to be actively held open by the controller if an idle cycle is selected. The low pressure valve typically opens passively, but it may open under active control to enable the timing of opening to be carefully controlled. Thus, the low pressure valve may be actively opened, or, if it has been actively held open this active holding open may be stopped. The high pressure valve may be actively or passively opened. Typically, the high pressure valve will be actively opened.

In some embodiments, instead of selecting only between idle cycles and full stroke pumping and/or motoring cycles, the fluid-working controller is also operable to vary the precise phasing of valve timings to create partial stroke pumping and/or partial stroke motoring cycles.

In a partial stroke pumping cycle, described in EP 1 537 333, the low pressure valve is closed later in the exhaust stroke so that only a part of the maximum stroke volume of the working chamber is displaced into the high pressure manifold. Typically, closure of the low pressure valve is delayed until just before top dead centre.

In a partial stroke motoring cycle, also described in EP 1 537 333, the high pressure valve is closed and the low pressure valve opened part way through the expansion stroke so that the volume of fluid received from the high pressure manifold and thus the net displacement of fluid is less than would otherwise be possible.

The controller thereby determines the net displacement of each working chamber on each cycle of working chamber volume by actively controlling the electronically controlled valves in the form of LPV (and where required, e.g. during motoring, the HPV). Typically, the working chambers will be spaced apart in phase so that decisions as to the net displacement of individual working chambers will take place a plurality of times per rotation of the rotatable shaft, enabling rapid control of displacement. In examples there are 8, 10, 12 or 20 cylinders which are 45, 36, 30 or 18 degrees apart respectively in phase. The controller may receive or generate a displacement demand signal indicative of a demanded net displacement by one or more of the working chambers in combination and the net displacement of each working chamber may, for example, be selected so that the time averaged net displacement of the one or more working chambers in combination matches the demanded displacement. Alternative control modes are described below.

A synthetically commutated pump (for example a pump as described above with reference to FIG. 1) can be used as a direct replacement for a swash plate machine. The control strategies can easily mimic pressure compensation, flow control, load sense, variable power control or variable power limit control of the machine and more as described later in this document.

Figure 2:
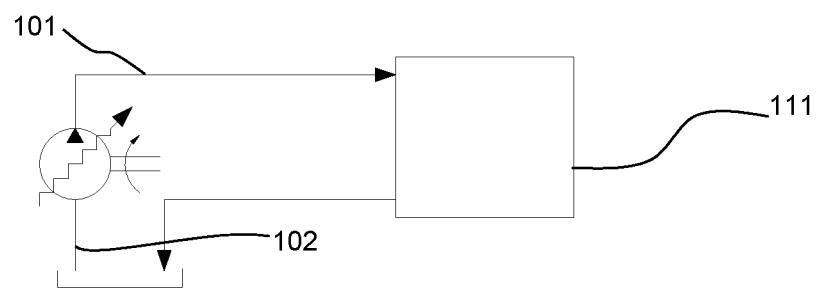
FIG. 2. Is a direct actuation synthetically commutated pump powered hydraulic load.

FIG. 2 relates to a system, where a pair of loads (111, 112) (functioning as fluid consumers) is connected to a single machine. It is anticipated that both loads (111,112) are high pressure, but one will typically experience a higher high pressure than the other.

Figure 3:
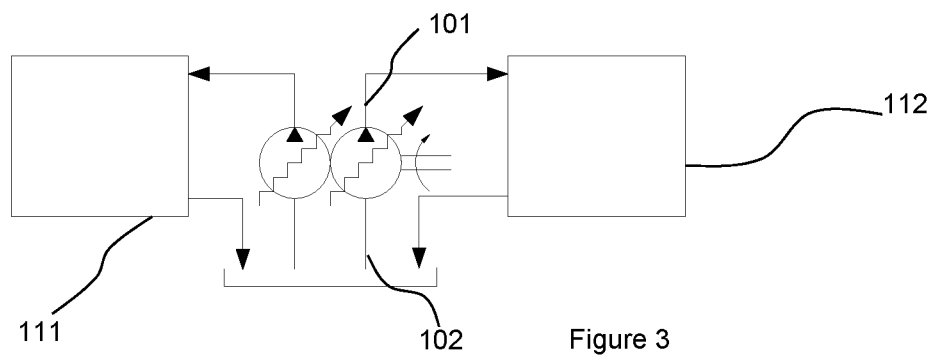
FIG. 3. Is a multi-service common shaft machine, with direct actuation of synthetically commutated pump powered hydraulic loads.

Supply to more than one Load—e.g. Multi-Service HPU:

As described above, the synthetically commutated pump can be arranged to have multiple services supplying more than one hydraulic load (111,112) at different pressure, flow or any other control requirement. FIG. 3 relates to a configuration of physically separate synthetically commutated machines on a common shaft.

It is possible to adapt the electronic valve of one or more cylinders so that it acts passively, without electronic demand. This allows one or more of the services of a multi-service machine to deliver constant flow, even if the controller is disabled (e.g. in the event of malfunction or power failure). This option may be useful as a supply for safety-critical functions.

When multiple services are used, it is possible to impose a global torque or power limit to the machine. This allows a small prime-mover (being an example of a fluid consumer) to be connected to a synthetically commutated pump with a maximum load which exceeds the capability of the prime mover. This can be achieved by reducing the power demand of each service in proportion such that the global limit is respected. Alternatively, a priority system can be applied so that the system designer can chose the relative priority of the services, or the priority can be decided at run-time depending on the state or condition of the HPU or the load.

Ultimately, it is possible to connect multiple synthetically commutated pump services to multiple loads via a matrix of intermediate digital switching valves. Individual synthetically commutated pump services may be switched in and out dynamically, to supply individual loads depending on their demands and priorities. Such circuits may allow proportional valves to be eliminated in some applications, resulting in further efficiency savings.

Figure 4:
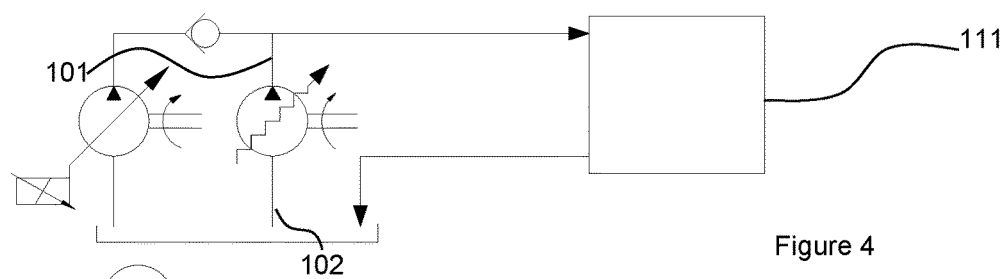
FIG. 4. Is a hybrid (a synthetically commutated pump and non-synthetically commutated pump) supplying to a load.

Hybrid HPU:

The synthetically commutated pump can be combined with other styles of pump such as swash plate, vane or gear pumps to add or subtract to the flow output of the non-synthetically commutated pump to provide the desired flow and control. The hybrid HPU can have any combination of non-synthetically commutated pump and synthetically commutated pump machines. FIG. 4 shows a configuration with a pressure compensated swash plate machine in combination with a synthetically commutated pump.

HPU with Energy Storage:

By using some of the cylinders of the synthetically commutated pump to form a service that provides flow to and from an accumulator, energy can be stored for later use. This configuration requires that the accumulator service cylinders are of pump/motor type. This allows the flow to be pushed into the accumulator and recovered from the accumulator. The advantage of this topology over the typical addition of an accumulator to the supply output is that much more of the energy in the accumulator can be used as it is not constrained to a constant pressure (as it would be for an accumulator added to the supply output). Regeneration (i.e. motoring of a pump/motor, to produce pressure) may occur with increase of pressure being fed to an accumulator. Alternatively, the pressure may be fed elsewhere.

Figure 5:
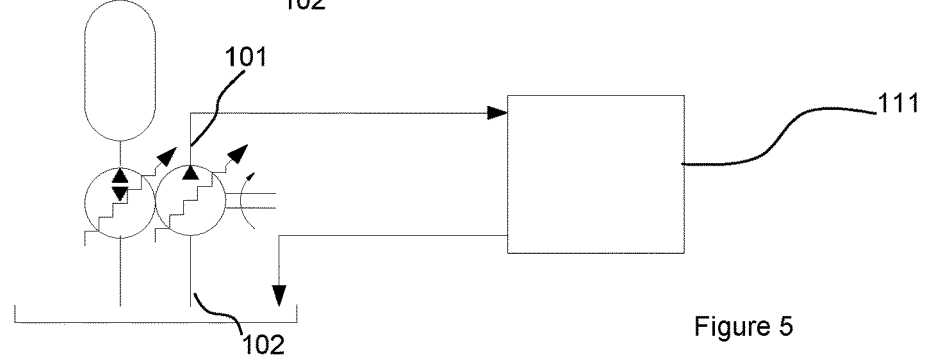
FIG. 5. Is a through shafted synthetically commutated pump with energy storage in an accumulator supplying to a load.

FIG. 5 shows the implementation with accumulator.

Figure 6:
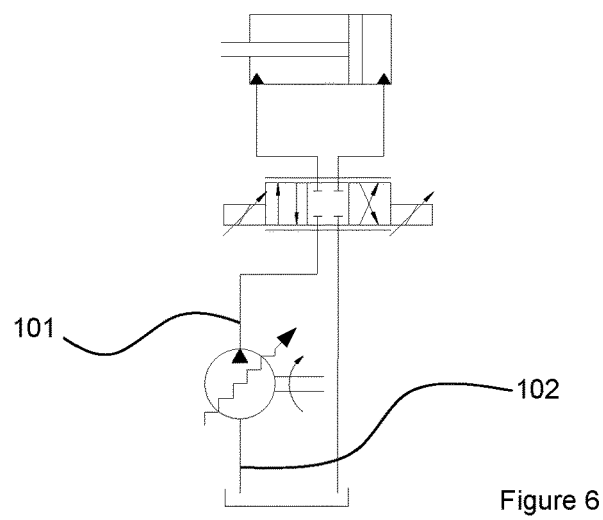
FIG. 6. Is a direct actuation synthetically commutated pump with proportional valve.
Figure 7:
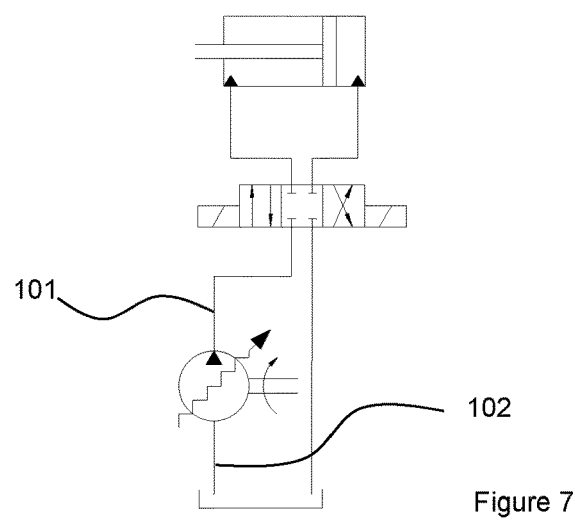
FIG. 7. Is a direct actuation synthetically commutated pump with direction valve.
Figure 8:
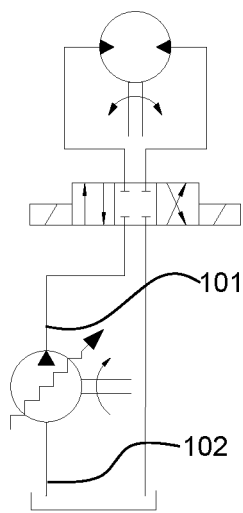
FIG. 8. Is a direct actuation synthetically commutated pump/motor with directional valve and Hydraulic Motor.

By allowing the synthetically commutated pump to directly manage the motion of the ram/cylinder (being an example of a fluid consumer), the proportional valve of FIG. 6, can be replaced by a directional control valve as shown in FIG. 7. While the bandwidth of a high performance servo valve may not be obtainable in this way, the pressure loss and cost of the proportional valve can be greatly reduced. The actuator may be of a ram/cylinder type as in FIG. 7 or hydraulic motor as in FIG. 8 or any other hydraulic actuator or any other hydraulic load.

For the purpose of interpreting claim 1, the fluid drive system comprises a driven pump (which encompasses a pump/motor which may periodically operate as a motor), and a motor. It is intended that this definition of motor includes a linear hydraulic motor, more commonly known as a ram/cylinder.

Figure 9:
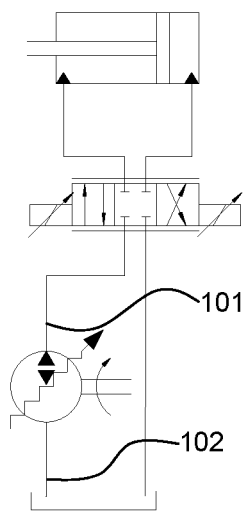
FIG. 9. Is a direct actuation synthetically commutated pump/motor for energy recovery, with proportional valve, and double acting ram.

Direct Actuation Implementation with Energy Recovery:

If the loads are inertial in nature there is some benefit in recovering the inertial energy back into the pump crank shaft with the use of a synthetically commutated pump/motor instead of synthetically commutated pump which by its definition acts only as a pump. FIG. 9 shows this implementation with a proportional valve, FIG. 10 with a directional valve.

Figure 11:
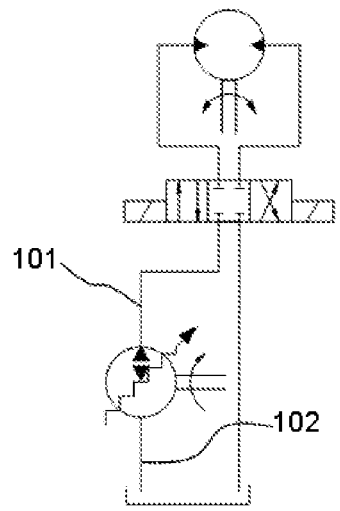
FIG. 11. Is a direct actuation synthetically commutated pump/motor for energy recovery, with directional valve and hydraulic motor.
Figure 10:
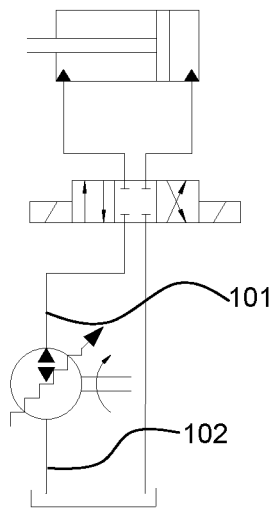
FIG. 10. Is a direct actuation synthetically commutated pump/motor for energy recovery, with directional valve, and double acting ram.

FIG. 11 shows an identical configuration to that of FIG. 10, however the fluid consumer of a cylinder/ram is replaced instead with a hydraulic motor.

Figure 12:
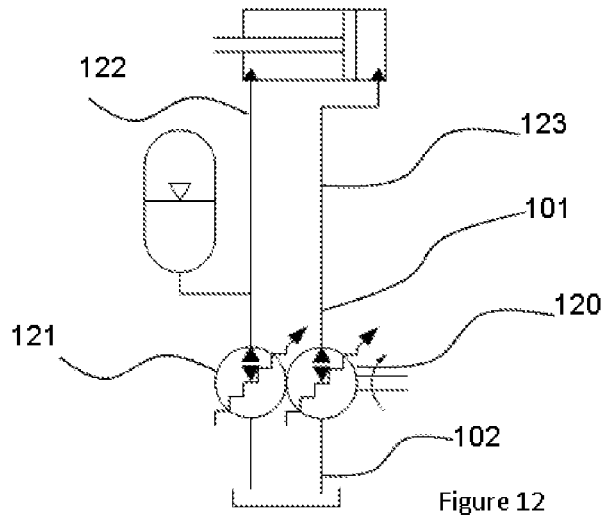
FIG. 12. Is a valve-less direct actuation machine connected to two synthetically commutated pump/motors with energy recovery, and a double acting ram.

Direct Actuation Implementation with Energy Recovery without Directional Control Valve:

The directional valves can be eliminated by connection of each side of the actuator to independent pump services. In doing this the system becomes hydraulically very stiff, in some circumstances adding an accumulator to one service adds compliance which may be needed. By controlling the accumulator service in pressure control mode, and the stiff service in flow control mode, the system is easily controlled. FIG. 12 shows a circuit according to this implementation.

Figure 13:
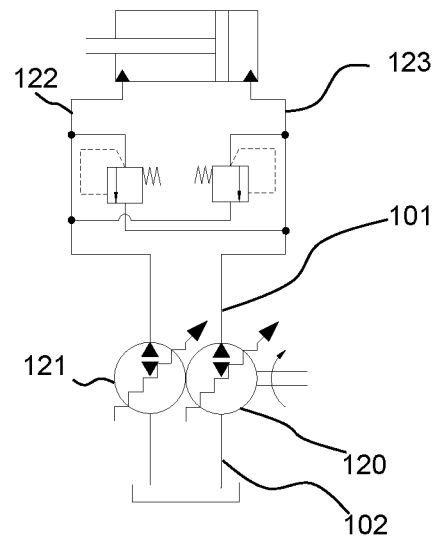
FIG. 13. Is a valve-less direct actuation system with two synthetically commutated pump/motors with energy recovery stiff system, and a double acting ram.

Direct actuation Implementation with Energy Recovery without Directional Control Valve (Stiff System):

As above, the directional valves can be eliminated by connection of each side of the fluid consumer to independent pump and/or motor services. For an embodiment comprising a fluid consumer in the form of a ram/cylinder, if the ratio of the pump displacement to the oil column stiffness is sufficient, the accumulator of FIG. 12 schematic can be eliminated. As in FIG. 13, the addition of cross line relief valves can help prevent an overpressure situation due to load inertia or the control loop, though in many applications may not be necessary.

Figure 14:
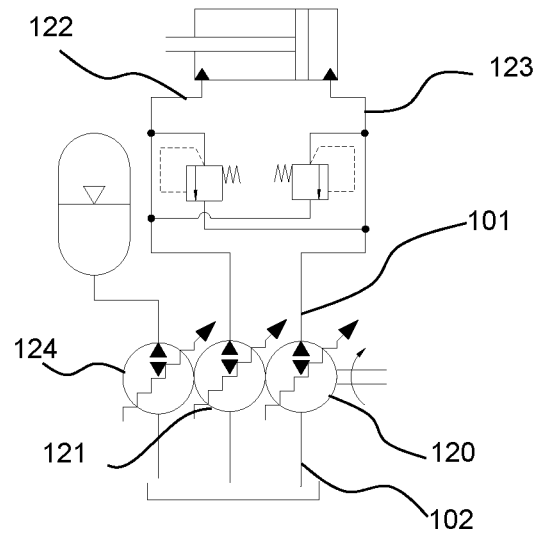
FIG. 14. Is a direct actuation system with an energy recovery stiff system, with three through-shafted synthetically commutated pump/motors, a double acting ram, and cross-line relief, and one of the pump/motors having dedicated fluid connection to the accumulator.

If the energy stored in the load/fluid consumer is high, an additional service with an accumulator can be added to store the energy and reduce the pump over-speeding, as shown in schematic of FIG. 14.

Figure 15:
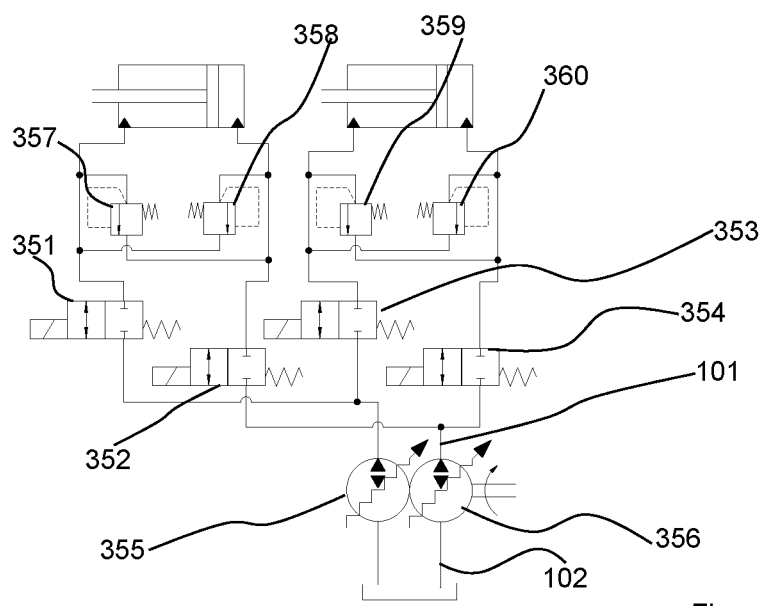
FIG. 15. Is a pair of direct actuation synthetically commutated pumps/motors, featuring cross line relief, and a pair of double acting rams.

If multiple loads require actuation but not at the same time, valves can be added to connect or isolate the pump pair to the load cylinders as in FIG. 15. Relief valves returning to tank are a necessary safety feature for realisation of this circuit, especially connected to the small area side (side of piston with con rod). However, such valves are not an absolute requirement for operation, and have been omitted from the images for clarity purposes. If both pumps are operated in closed loop control with both pressure and displacement feedback, the circuit shown is fully functional. Although shown with cross line relief valves, the embodiment of FIG. 13 may be realised without such valves.

Figure 16:
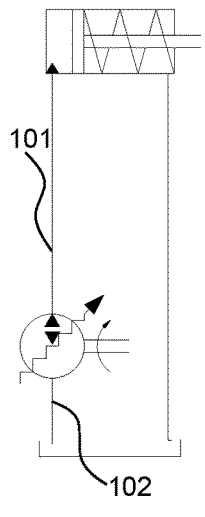
FIG. 16. Is a valve-less direct actuation synthetically commutated pump/motor with energy recovery stiff system with single acting ram.
Figure 17:
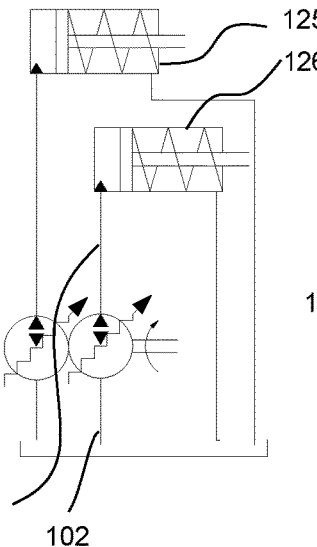
FIG. 17. Is a valve-less direct actuation synthetically commutated pump/motor, with 2 single acting rams.
Figure 18:
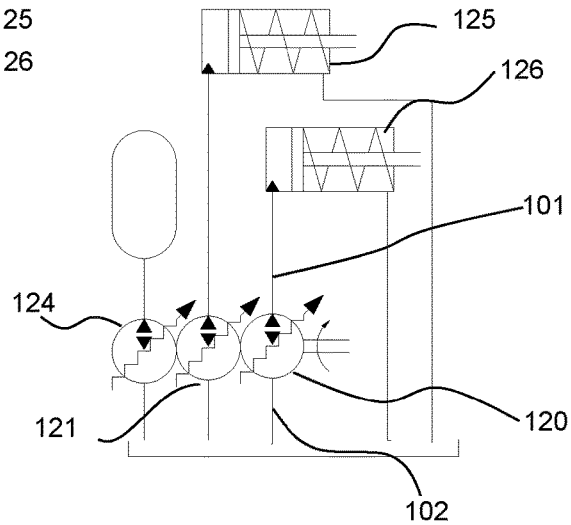
FIG. 18. Is a valve-less direct actuation synthetically commutated pump/motor with 2 single acting rams, one service leading to an accumulator.
Figure 20:
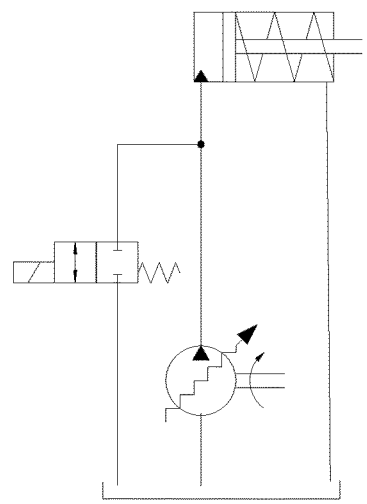
FIG. 20. Is a direct drive single acting ram drive hydraulic circuit, with direct connection between the synthetically commutate pump and the ram, with a switchable relief line to tank.

Single Acting Ram/Cylinder, Direct Actuation:

In the above direct actuation implementations it is necessary to either use a directional valve or multiple services. Sometimes only a single acting cylinder is necessary if there is a spring or mass is biased to return the cylinder. In FIG. 16 the implementation is very simple and the system can often be used in position control without sensors if a high level of positional accuracy is not required. It should be noted for this figure, and others, that whilst shown as spring return, alternative return biasing mechanisms are possible. Adding additional services allows independent actuation of more actuators as in FIG. 17. In addition if there is a need to store energy, the addition of an accumulator in FIG. 18 is an efficient solution. The synthetically commutated pump/motor is typically necessary for this method to allow the actuator to return, however, an external 2-way valve with the synthetically commutated pump will also work to allow the actuator to return as in FIG. 20 if control of the return motion is not required.

Figure 19:
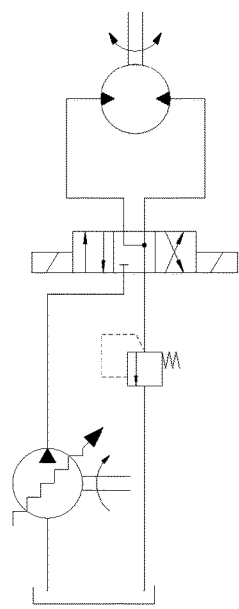
FIG. 19. Is a direct actuation synthetically commutated pump with valve block and hydraulic motor, and additional valve.

Direct Actuation with Open Center Valves:

Open center valves can be used to isolate the pump from the actuator circuit with the typical cross line relief configuration as shown in FIG. 19.

The open center valve configuration allows for the service to be applied to other actuators as long as concurrent actuation is not required. In such circuits, a common requirement is to control an over-running load. In this case, the use of open center valves has been found to be convenient.

Injection Moulding Machine

Figure 21:
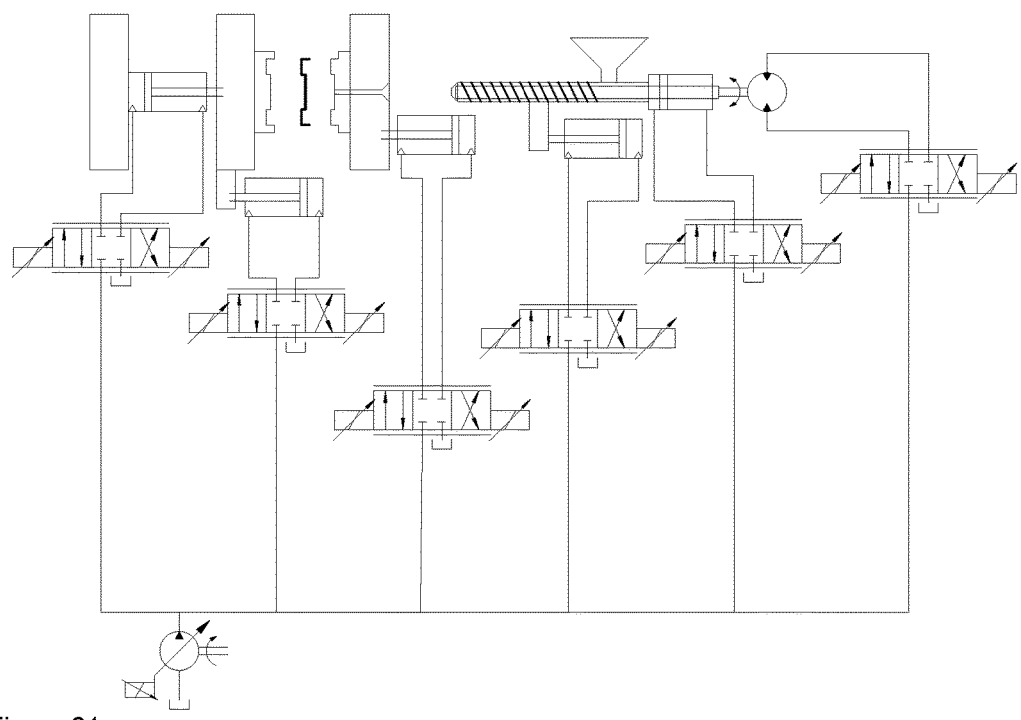
FIG. 21. Is a conventional injection moulding circuit.
Figure 22:
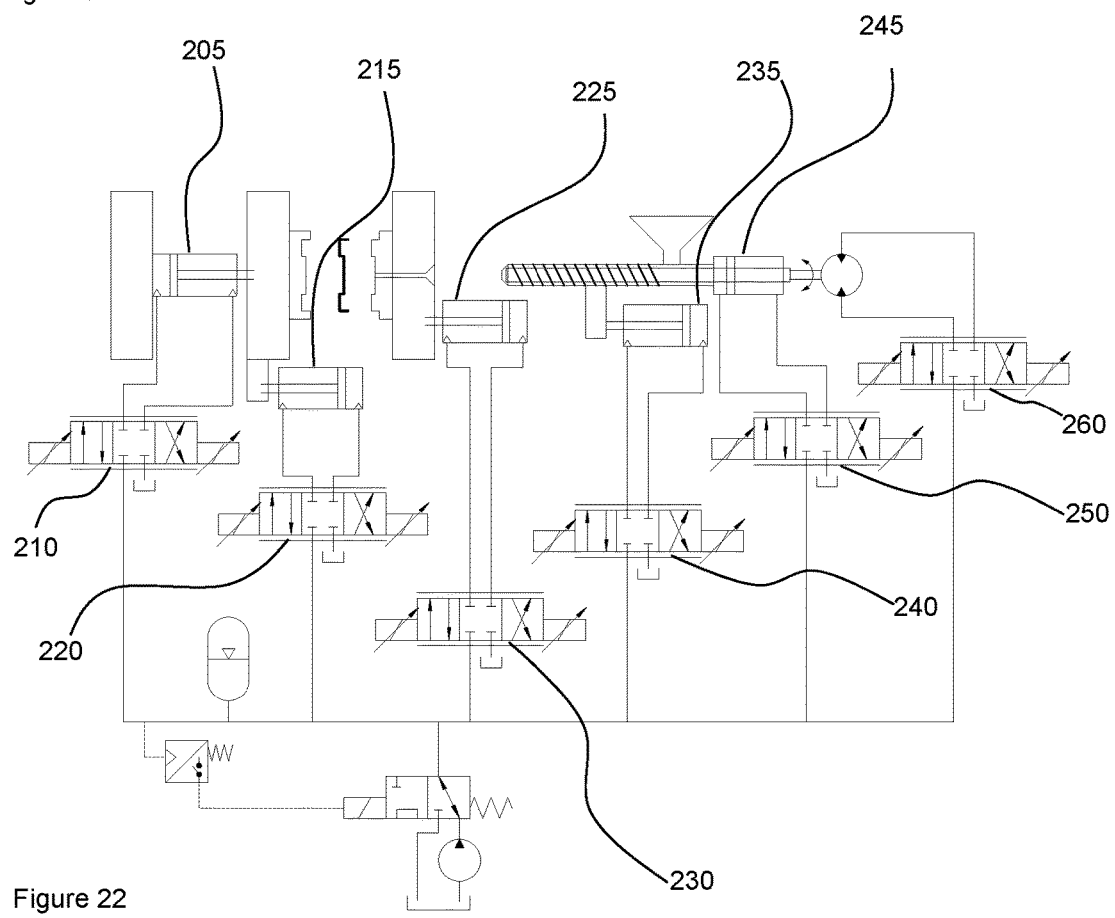
FIG. 22. Is a further conventional injection moulding circuit.

An injection moulding machine shown in FIG. 21 typically consists of a two part mould of which one part is fixed and the other is movable to enable the part to be removed. The mould must be both opened and closed quickly and clamped shut with very high force. Various mechanisms exist for this function such as toggle clamps, screw clamps and separate actuators for mould open/close and clamp functions. On the injection side of the machine the injection unit utilizes a screw which is rotated to plasticize the plastic and an injection ram to force the molten plastic into the mould cavity. An injection moulding machine may be adapted perform moulding of rubber, or die casting. In addition rams are used to hold the injection unit on the mould and to eject the moulded part from the mould cavity. Typically a hydraulic machine utilizes a single pump driven by a constant speed electric motor to create hydraulic flow, the hydraulic flow is directed through a series of directional valves, and these valves are often proportional in nature to enable fine control of the magnitude and direction of the flow, to direct the flow to the appropriate actuator. Historically the pump has been of a fixed displacement vane or plunger type pump. More recently, variable displacement type pumps have been used to reduce energy consumption and heat generation. The variable displacement function is typically achieved through the use of a plunger type pump where the displacement of the plunger is varied in response to a hydraulic or electronic pressure sense or a fixed displacement pump coupled to a variable speed electric motor or variable frequency or servo motor type. FIG. 21 references a variable displacement plunger type pump with hydraulic pressure feedback. Another architecture in use to reduce energy consumption is referenced in FIG. 22 where a fixed displacement pump charges up a hydraulic energy storage device such as an accumulator, when the accumulator is fully charged the pump flow is directed to the tank to reduce energy consumption. FIG. 22 provides an example of typical injection moulding machine components including:

- a platen clamp (205) for applying large pressures to the mould in preparation for the injection stage,
- the mould close/open ram (215) for opening and closing the mould allowing closure of the cavity and respectively opening of the cavity to a sufficient extent,
- an ejector ram (225) to operate ejector pins to eject the finished mould item,
- a nozzle ram (235) to extend and retract the injection unit,
- an injection ram (245) to move the injection nozzle screw forward towards the platen/mould outer acting as a plunger for the heated injectable fluid,
- and a screw drive to rotate the screw injector and charge the barrel with injection fluid, fed from a hopper.

The drawbacks of the variable displacement plunger pump are the efficiency at low flow rate is very low, and the response time from low to high flow or high to low flow is limited. The fixed displacement pump driven by a variable speed electric motor in order to provide the variable speed drive has a high cost. In particular, the efficiency at low flow rate is low, and the response time from low to high flow rate is limited. The hydraulic energy storage system is effective, however in order to maintain constant pressure, the accumulator(s) needs to be sized such that the volume is very large. Such an accumulator(s) is more expensive and requires substantial space to store the accumulators. Also, with constant pressure the high throttling losses across the proportional valves still exist due to the constant high pressure of the fluid supply.

Figure 23:
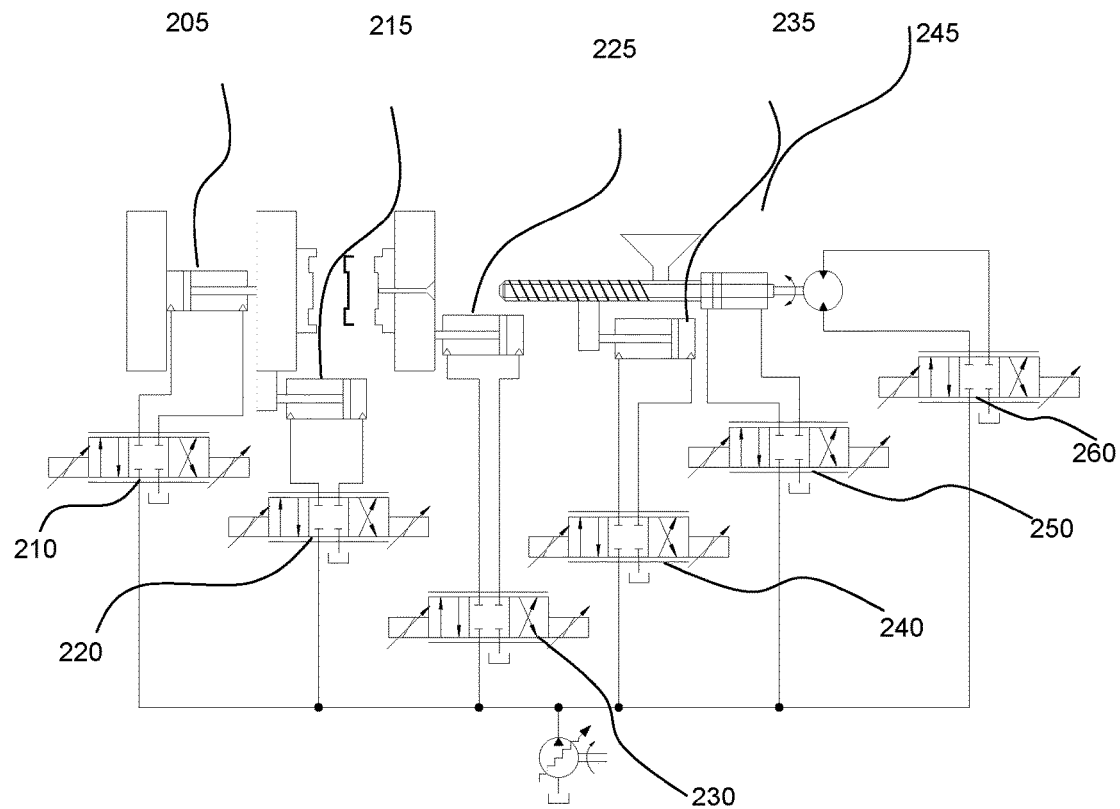
FIG. 23. Is an injection moulding machine hydraulic circuit utilising synthetically commutated pump.

As referenced in FIG. 23 the invention replaces the current pump technology with a synthetically commutated pump. The flow output of the synthetically commutated pump is varied electronically in response to the load to generate the exact required flow. The response time of the synthetically commutated pump is in the order of 30 ms and the efficiency at all flow output rates is very high. FIG. 23 shows the direct replacement of conventional and state of the art pump technologies with synthetically commutated pump in a generic type hydraulic circuit in an injection moulding machine.

Figure 24:
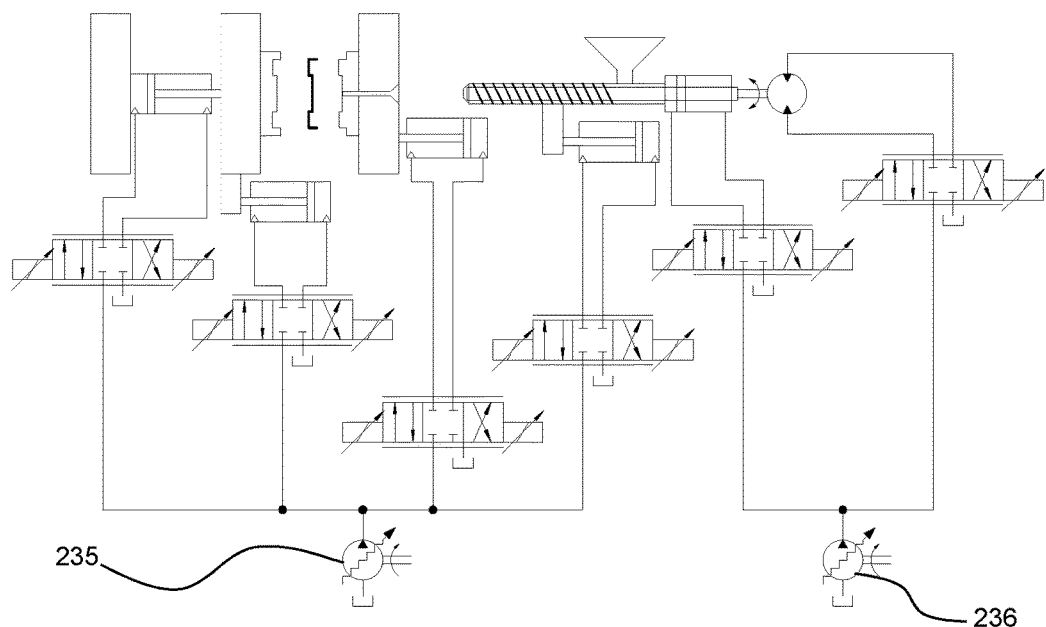
FIG. 24. Is an injection moulding machine hydraulic circuit, utilising two synthetically commutated pumps.

The synthetically commutated pump can be divided up by combining cylinders to isolated outputs or services from within the same pump housing driven by the same electric motor and shaft. FIG. 24 shows the same synthetically commutated pump (235 & 236) of FIG. 23, but divided into two services to independently drive work functions of the same system. A work function, or working function refers to a function by which the fluid-working machine does work (e.g. a hydraulic motor or other actuator) or by which work is done on the fluid-working machine (e.g. a hydraulic pump). The two services could be provided within a single machine body and single shaft, two machine bodies and single shaft, or two machine bodies and two shafts. This same logic of possible machines and real options, should be used to interpret the other illustrated circuits. The independence of services enables the flow and pressure requirement of each work function to be optimised for each work function to reduce the throttling losses in the valves and thus reducing energy consumption. Furthermore in respect of reducing energy consumption, the timing of the flow to each consumer can be optimised, depending on the machine type and machine cycle (i.e. pump, or motor, or idle).

Figure 25:
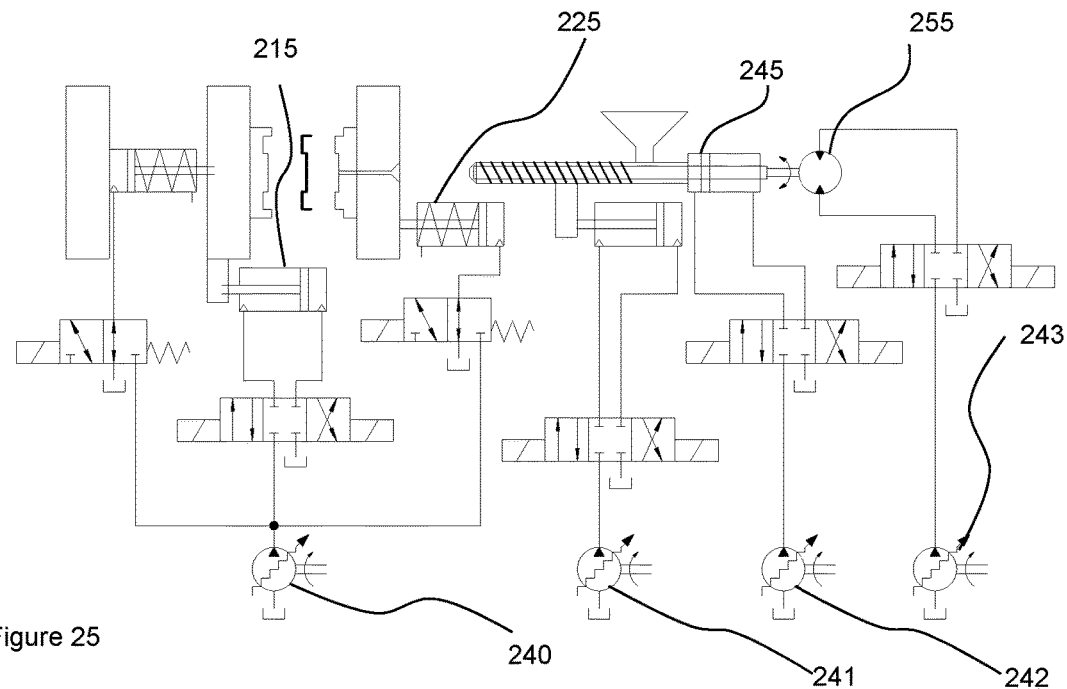
FIG. 25. Is an injection moulding machine hydraulic circuit, utilising four synthetically commutated pumps.

If the injection moulding machine circuit is broken down even further the individual work functions can be broken out to separate services as referenced in FIG. 25. If a synthetically commutated pump service directly provides flow to an individual work function the flow and pressure requirement of the work function can be exactly met by the synthetically commutated pump and thus the proportional valves are no longer required to throttle the pump flow further reducing the energy consumption. As an example in FIG. 25 the screw drive (255) is driven directly from an independent synthetically commutated pump service where the valve only controls the rotation direction, the speed of rotation is directly controlled by the synthetically commutated pump (243) output. Also in FIG. 25 the mould open/close actuator (215) flow is sourced from a synthetically commutated pump service (240) where the motion profile of the mould is directly controlled by the synthetically commutated pump flow output. In this case the mould open/close, clamp and ejection work functions are combined to a single synthetically commutated pump service (240), this is possible as none of the work functions are required to operate concurrently in this case and the synthetically commutated pump (240) flow output is only ever directed to one of these work functions at a time and reduces the need for so many synthetically commutated pump services. A person skilled in the art will notice there are many ways to split up the synthetically commutated pump services to the work functions depending on the number of concurrent functions of the particular machine, this is one example.

Many of the work functions only require control of the force and displacement in one direction, in this case the double acting ram can be replaced by a single acting ram and the directional valve replaced with a poppet type on/off valve. FIG. 25 references this concept where the clamp and ejection work functions are replaced with a single acting ram to reduce cost, complexity and reduce parasitic losses typical of directional valves.

During parts of the injection moulding cycle some services may not be required to produce flow while at the same time others require high levels of flow. In these parts of the cycle it is possible to join the two services together to sum the output of both services. Referenced in FIG. 26, a valve (270) is added to join together the output of one service (243) with a further service (240), so that the further service (240) becomes a kind of top-up machine.

Some of the work functions inherently store energy that can be recovered. In these situations a synthetically commutated Pump/motor is used to recover this energy. A synthetically commutated pump/motor (242) is used to recover the energy stored in the fluid and molten plastic columns during the injection cycle. In respect of FIG. 26, a further synthetically commutated pump/motor (240) can recover the kinetic energy of the mass of the mould during deceleration. This energy is recovered and returned to the pump crankshaft to be either used by other services or to increase the speed of the crankshaft (reduce the load on the electric motor, or converted to electricity in the electric motor).

Figure 26:
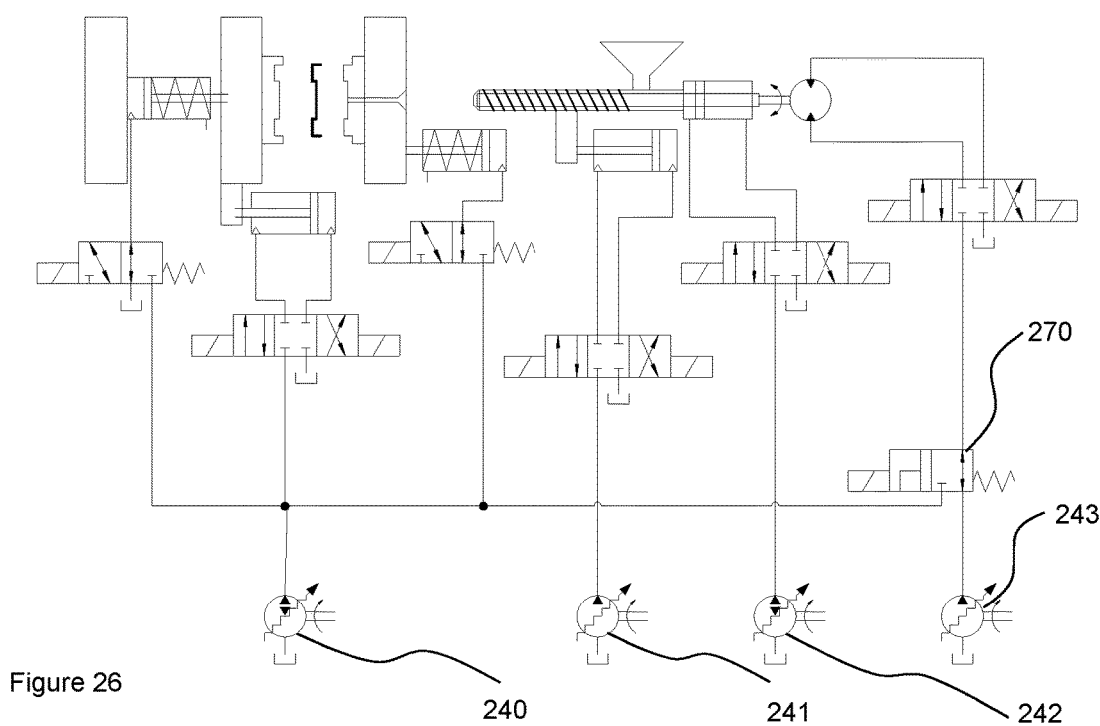
FIG. 26. Is an injection moulding machine hydraulic circuit, utilising two synthetically commutated pumps, and two synthetically commutated pump/motors.

Taking the concept of joining two services together shown in FIG. 26, a 'flexible service' pump (239) can be added to the existing pump arrangement as shown in FIG. 27. This 'flexible service' is not permanently attached to any particular work function, rather it is a 'floating' service to be used when another service encounters a lack of flow capacity. The 'flexible service' pump (239) is connected to other pumps (240, 241, 242, 243) with respective valves (276, 277, 278, 279) which allows the flow to add to any service and can also join groups of services together. For example if the plasticizing work function (shown as a bi-directional hydraulic motor) and injection work function ram (245) is not required and the mould opening work function (ram 215) requires additional flow, energizing valves (278, 279) sums the output of services (242, 243) resulting in a very efficient use of the pump capacity. The high bandwidth and controllability of the synthetically commutated pump allows the pressure of the services to be equalized very quickly prior to switching the valves and for the total output of all of the combined services to be accurately controlled once combined.

Presses

Figure 38:
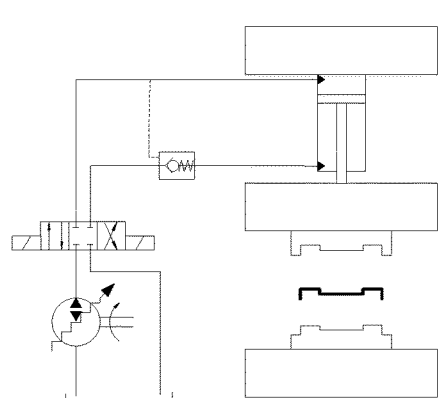
FIG. 38. Is a circuit for use in a press, using a single synthetically commutated pump/motors are connected for regeneration purposes.

FIG. 38 references the basic press (hydraulic ram driven by a pump which is controlled by a valve which presses on a slide to form parts between the die). In this case the source of hydraulic power is a synthetically commutated Pump/motor where the pump variable flow feature is used to generate the force and displacement profile of the slide and the synthetically commutated pump/motor is used to recover the compression energy stored in one or more of the fluid column and press frame especially at the end of the compression cycle.

Figure 39:
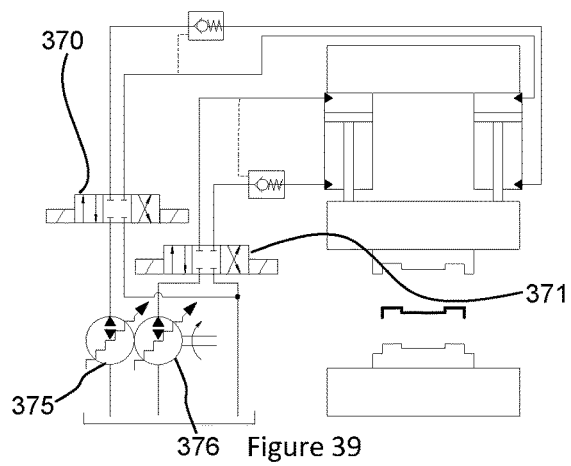
FIG. 39. Is a circuit for use in a press, using two synthetically commutated pump/motors.

Many presses utilize two or four post designs to manage the angle and force profile of the slide. FIG. 39 references a two post design (2 rams/cylinders). In this configuration it is necessary to coordinate the extension of the two rams to reduce the load on the slide and improve the die alignment. Typically this is achieved using expensive displacement sensors to measure the displacement of each ram and servo or proportional valves to accurately to control the flow of oil from the pump to the ram. When the system is configured such that a synthetically commutated pump/motor is used with each service (375, 376) dedicated to a single ram of a pair of rams through directional control valves (370 & 371), the displacement of the ram can be estimated by summing the estimated volume of fluid pumped during each pump cycle and taking into account a calculated compression of the fluid column from the ram internal pressure. Use of this functionality eliminates the need for expensive servo or proportional valves and may eliminate the need for displacement sensors. Alternatively if the open loop control strategy does not provide the required displacement accuracy, a control loop can be created around the displacement sensors. This function is demonstrated on a 2 post type press frame but may alternatively be valid for any number of actuators used in this way.

Figure 40:
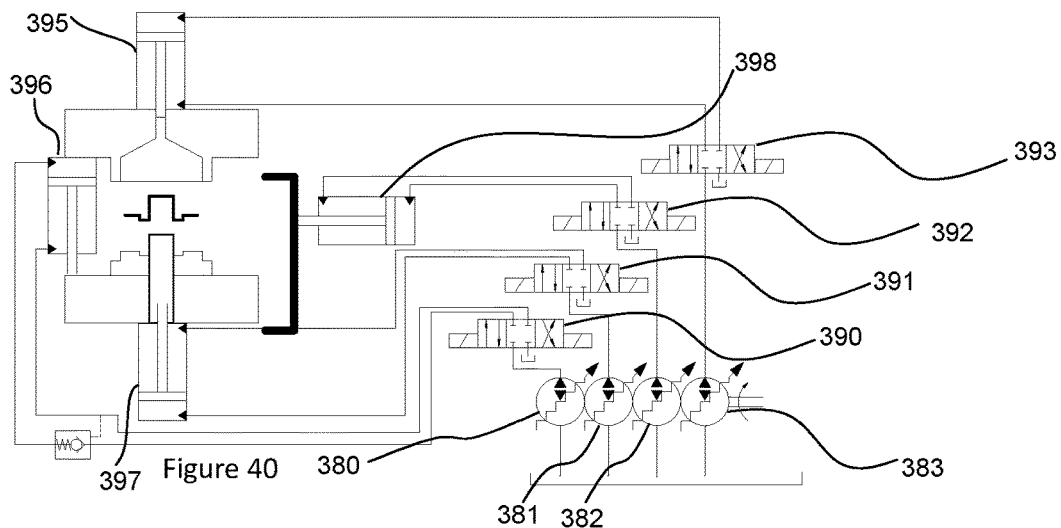
FIG. 40. Is a circuit for use in a hydro form press (four double acting rams & service sharing), using four synthetically commutated pump/motors.
Figure 41:
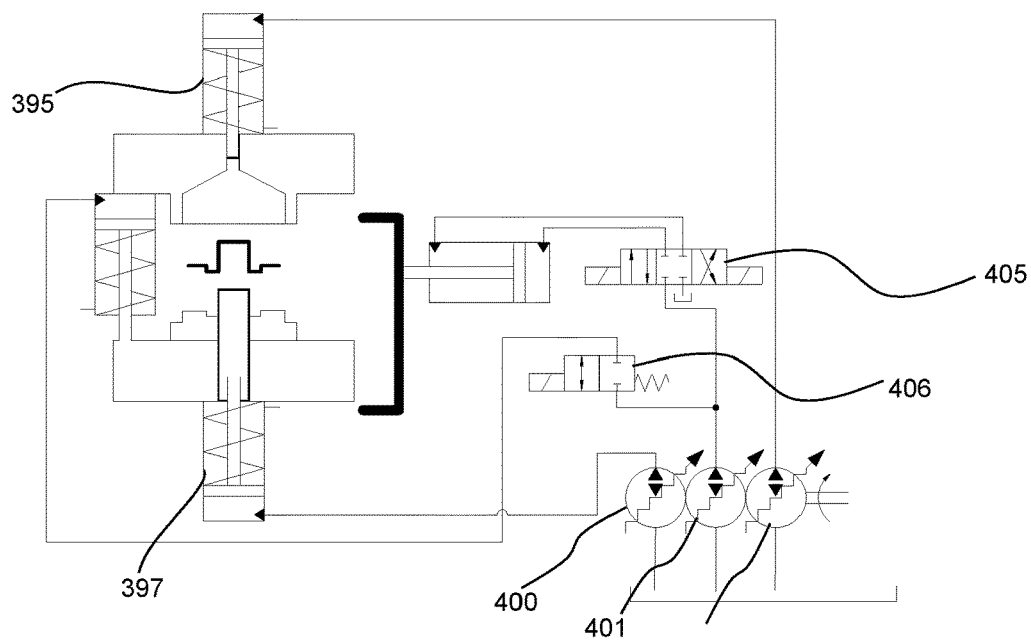
FIG. 41. Is a circuit for use in a hydro form press, (two double acting, and two single acting rams) using three synthetically commutated pump/motors.

Hydroforming is another style of press referenced in FIG. 40, where a ram (396) opens and closes the die, a further ram (398) locks the die in the closed position, and a further ram (395) pressurizes the fluid cavity and a further ram (397) forces the drawing punch in to the part. In this embodiment each ram (395, 396, 397, 398) is hydraulically connected and isolated by a valve (390, 391, 392, 393) and to a synthetically commutated pump/motor service (380, 381, 382, 383), thus allowing each ram to be operated independently and to recover the stored energy in the fluid columns and machine frame stiffness. An alternate embodiment shown in FIG. 41 comprises a pair of single acting rams used to pressurize a fluid cavity (ram 395) and to drive the drawing punch (ram 397), where these rams are driven directly by the respective synthetically commutated pump/motor services (402 & 400). The die open/close, and die lock rams are not operated concurrently and with valves (405, 406) they can operate from a single synthetically commutated pump/motor or synthetically commutated pump service 401. There is little energy in the ejector of the lock to recover during a regeneration phase, however the service is shared with the die open/close ram, which has inertial and gravitational potential energy to be recovered/regenerated. A person skilled in the art will notice there are many other combinations that can be used to optimize these press machines depending on the cycle configuration.

Control Methods:

Through the use of sensors and software the pump may be controlled in a variety of modes according to different methods. Below is a list of some of the control methods:

1) Pressure control—direct emulation of pressure compensated systems. The displacement of hydraulic fluid on each cycle of working chamber volume is selected so that the pressure at an output follows a pressure set point. Pressure set point can be easily changed dynamically in software as required. Pressure feedback is from a pressure sensor, which may be mounted on the synthetically commutated pump or remotely.
2) Flow Control—pump flow can be varied as a result of feedback from flow sensors, actuator displacement or even in open loop.
3) Feed Forward—Using knowledge of upcoming pressure and flow requirements the pump output can use the preview information to respond. For example the servo valve command signal can be fed into the pump controller to maintain accurate pressure tracking.
4) Motor Horsepower Control—Any function of pressure and flow can be used to modify the pump output. A simple example is basic horsepower or torque control, however, more complex relationships can also be implemented
5) Closed loop displacement control
6) Open loop displacement control
7) Combination of force and displacement control Controller Features The synthetically commutated pump controller is responsible for firing the electronic valves which control the flow from each cylinder. This is done according to position feedback from the integral shaft encoder, pressure and temperature transducers, and in response to external or internal command signals.

Many of the parameters of the synthetically commutated pump controller can be adjusted at run-time by using a computer interface program which connects via serial or Ethernet protocol. Such parameters include control gains and setpoints, limits, I/O (input/output) scaling and fault thresholds. Once the desired adjustments are made, parameters can be saved to flash memory and the controller will boot up with these new defaults.

In complex systems, this synthetically commutated pump controller may be configured to be a slave to a system master controller, such as a PLC (programmable logic controller), which sends commands by digital, analogue or Fieldbus (e.g. CAN (controller area network) bus). Such communications may be bi-directional, in which the synthetically commutated pump reports back its current status (e.g. flow, pressure, power) and any fault codes. The synthetically commutated pump controller can be configured in software to locally protect the synthetically commutated pump from over-temperature or over-pressure by reducing the output flow.

However, in simpler systems the synthetically commutated pump controller may take over the role as the only controller in the system. In this case, the synthetically commutated pump controller may be programmed to execute overall system control functions such as commanding electric motor contactors, performing auxiliary valve control for cooling circuits, and monitoring system protection sensors. To support these functions, the synthetically commutated pump controller is provided with spare analogue and digital I/O, including 24V high-current outputs suitable for driving relay coils and solenoid valves directly. References above to direct actuation of synthetically commutated machine, are equivalent to 'Displacement Control' using synthetically commutated machine. In the art, 'Displacement Control' is also known as 'pump control' [source: Linkoping Studies in Science and Technology Thesis No. 1372, Saving Energy in Construction Machinery using Displacement Control Hydraulics—Concept Realization and Validation, Kim Heybroek, 2008, ISBN 978-91-7393-860-0]. Displacement control in the context of the present invention describes throttleless actuation achieved by using synthetically controlled machine(s). In such a system the electronically commutated valve system controlling displacement is used as the final control element.

Multiple Pressure Supplies

With reference to FIGS. 28 to 31, these relate to methods to maintain dual pressure supplies with conventional switching. The output loads (111,112) are provided with high and low pressure sources which is an architecture commonly used in injection moulding machines or any other machine that may require flow sources at more than one pressure. FIG. 28 shows 3 services, of $P_{low}$, $P_{high}$, and dual configuration supply where pump (270) primarily flows to the low pressure load (111), pump (272) primarily flows to the high pressure load (112) and pump (271) flows to the low pressure load (111) when the solenoid flow diverting valve is de-energized and to the high pressure load (112) when the valve energized. FIG. 29 shows 2 services, $P_{high}$, and dual configuration supply where pump (272) primarily flows to the high pressure load (112) and pump (271) flows to the low pressure load (111) when the solenoid flow diverting valve is de-energized and to the high pressure load (112) when the valve is energized. FIG. 30 shows two services $P_{low}$, and dual configuration supply where pump (270) primarily flows to the low pressure load (111) and pump (271) flows to the low pressure load (111) when the solenoid flow diverting valve is de-energized and to the high pressure load (112) when the valve is energized. FIG. 31 shows one service; dual configuration supply where the pump (271) flows to the low pressure load (111) when the valve is de-energized and to the high pressure load (112) when the solenoid flow diverting valve is energized. Accumulators may be required at the hydraulic load in order to maintain more constant pressure and flow.

LPV style switching denotes low pressure valve switching, further explained as " . . . electrical energisation of the solenoid coil is controlled by a microprocessor unit in response to at least one of output pressure of fluid and output displacement volume of fluid leaving the pump. Energisation of the solenoid coil can be used to move the valve member to its closed limit condition, de-energisation allowing the valve member to move under the influence of fluid flow-induced forces into its open limit condition" from U.S. Pat. No. 5,190,446 (Artemis).

Figure 32:
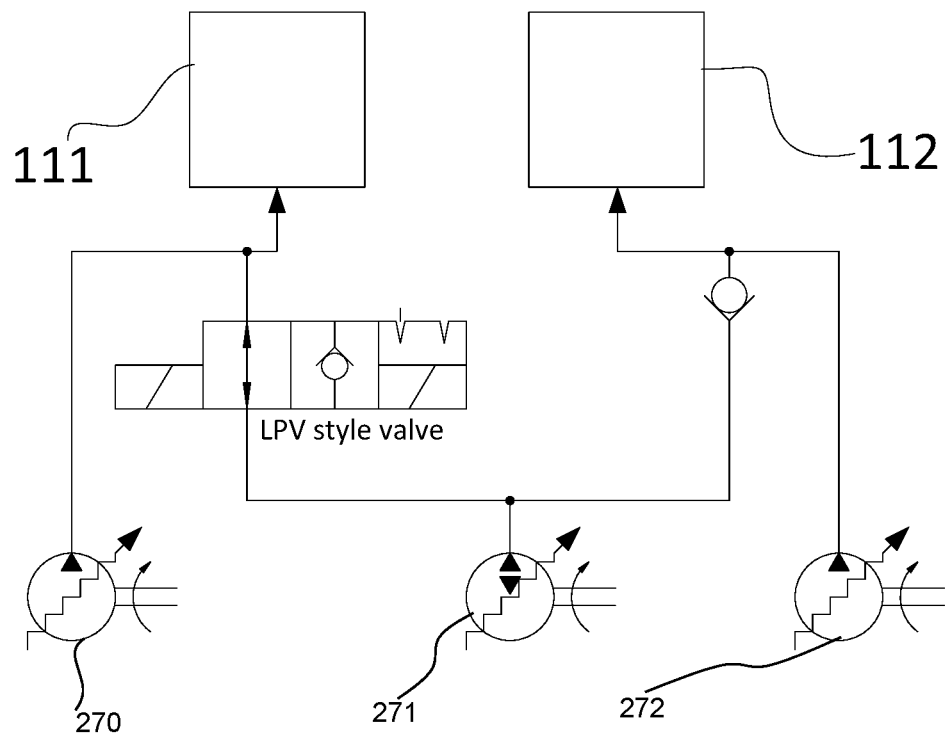
FIG. 32. Is a portion of an injection moulding machine, similar to FIG. 29, however dual pump needs to be synthetically commutated pump/motor to unlatch LPV style valve.

Circuit of FIG. 32 relates to a method to maintain dual pressure supplied for LPV style for switching. It uses a synthetically commutated pump/motor in the center position only to unlatch the LPV style valve which controls which pressure source the center pump flows to. The synthetically commutated pump/motor function of the centre pump (271) can be used to recover pressure energy from the low pressure circuit. The function of circuit in FIG. 32 is very similar to that of FIG. 28 where the illustrated valve directs the flow between the low (111) and high pressure load (112) as commanded. The proposed embodiment of the LPV requires the equalization of the pressure on the inlet and outlet ports before switching may occur. Synthetically commutated pump/motor (271) allows the inlet pressure to be adjusted to match the outlet pressure.

Figure 33:
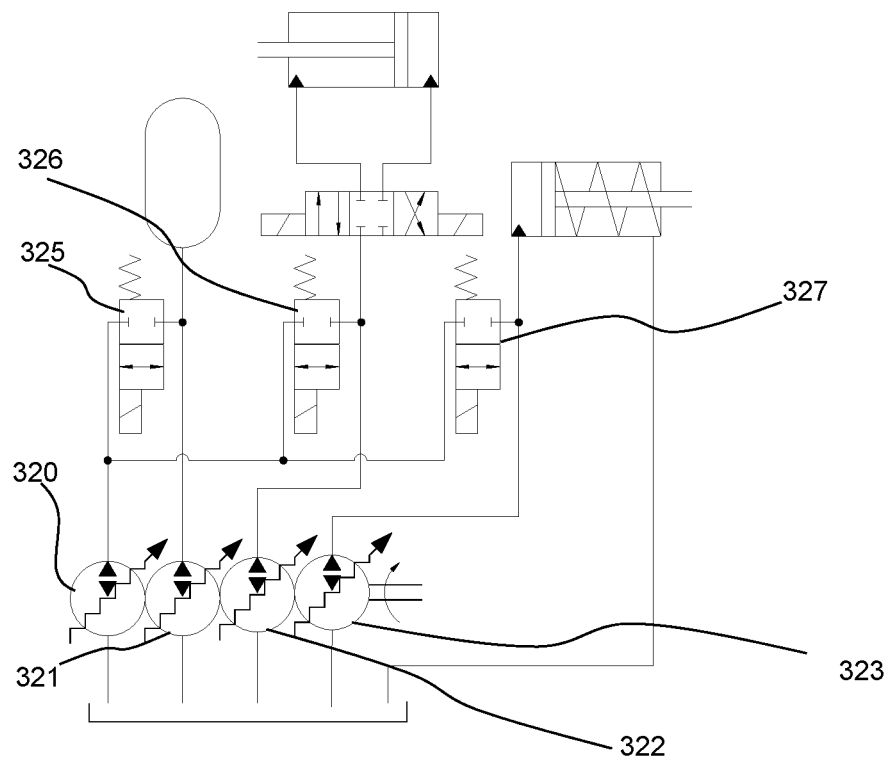
FIG. 33. Shows a through shafted four service machine, for control of three loads, suited to use in an injection moulding machine.

With reference to FIG. 33, this shows four through-shafted and coupled pump/motors, possibly within a single housing. The second pump/motor (321) is always connected to the accumulator. The third pump/motor (322) is always connected to the double acting ram. The fourth pump/motor (323) is always connected to the single acting ram. All the machines (321, 322, 323) may be switched in to supply and/or receive from a common line/rail, where the common line/rail is shown connected to first pump/motor (320) but may be connected to any flow source or sink and may be connected to the double acting cylinder and/or the single acting cylinder by energizing any of valves (325, 326, 327). The hydraulic loads are shown as an accumulator, double acting ram or single acting ram but may alternatively be any hydraulic sink or source of flow. A person skilled in the art can see that any combination of 'flexible services' may be added to any combination of loads, FIG. 33 is only one example of the possible combinations. This operational flexibility is especially suited to application in an injection moulding machine.

Figure 34:
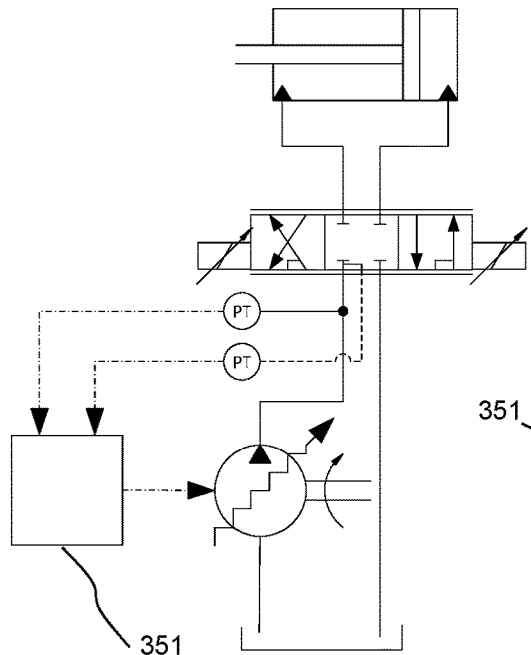
FIG. 34. Is a hydraulic circuit for driving a double acting ram, including electronic controller, connected to pressure sensors respectively on each line.

With reference to FIG. 34, this shows a single synthetically commutated pump connected to a double acting ram, via an intermediate three-way solenoid valve which may adopt a load sensing orifice to measure flow to the ram. Importantly there are two pressure transducers which are electronically connected to the controller (351); one for detecting the pump output pressure, and one for detecting the pressure drop across the load sensing orifice. As with mechanical load sensing systems the pump flow is modulated to maintain a fixed pressure drop across the load sensing orifice. As shown, the load sensing logic is implemented in the software of the controller using the two pressure sensors as inputs. For multiple flow consumers the load sense signal may either be interconnected fluidically with shuttle valves and a single pressure sensor or electronically with multiple pressure sensors.

Figure 35:
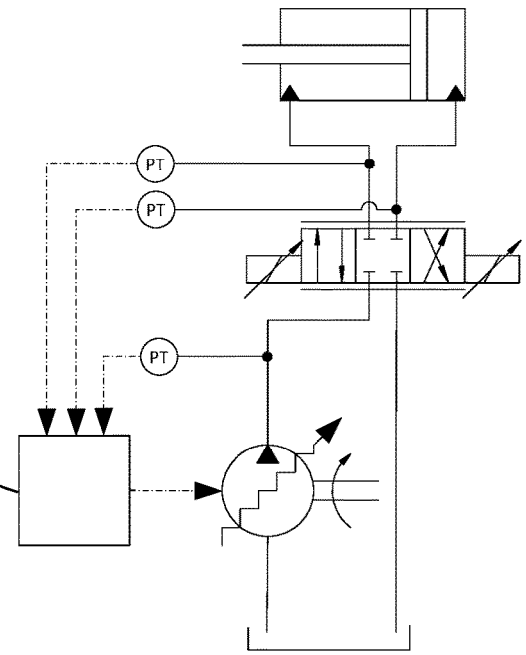
FIG. 35. Is a hydraulic circuit for driving a double acting ram, including electronic controller, connected to pressure sensors respectively on each line.
Figures 36, 37:
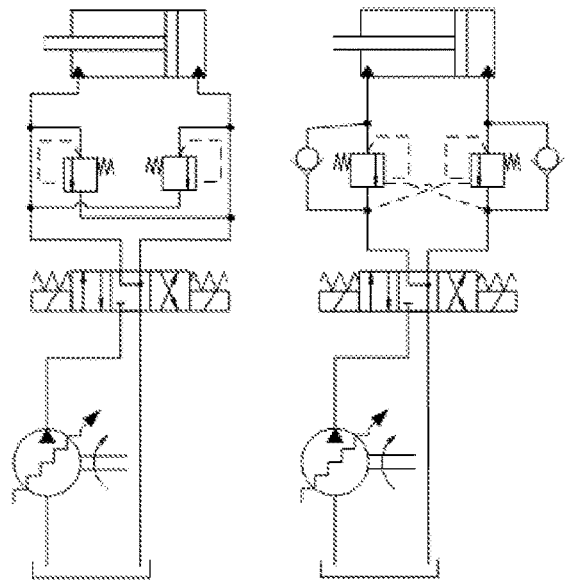
FIG. 36. Is a double acting cylinder control circuit using a synthetically commutated pump, with cross line relief between the cylinder connections.
FIG. 37. Is the same as FIG. 37, but includes a check valve in each of the cylinder connection lines.

With reference to FIG. 35, this shows a single synthetically commutated pump connected to a double acting ram, via an intermediate three-way solenoid valve which may adopt a cross-over position, a flow blocking position, or a straight through position. Importantly there are three pressure transducers which provide signals to the controller (351); one for the output of the pump, one for each side of the ram. The pressure sensor connected to the pressure port of the valve when the valve is switched to a non-fluid blocking position serves to measure the pressure drop across the valve. The pressure drop across the valve can be used to modulate the pump flow as a load sense type function previously mentioned. An advantage of the load sense implementation in FIG. 35 as compared to FIG. 34 is that the valve does not need to be a specific load sense type valve and can be a regular 4-way type directional or proportional valve or any other valve used to direct the flow to a fluid consumer. The load sense function in FIG. 35 is purely implemented electronically in the synthetically commutated pump controller.

Circuits Comprising Hydraulic Intensifiers

Figure 42:
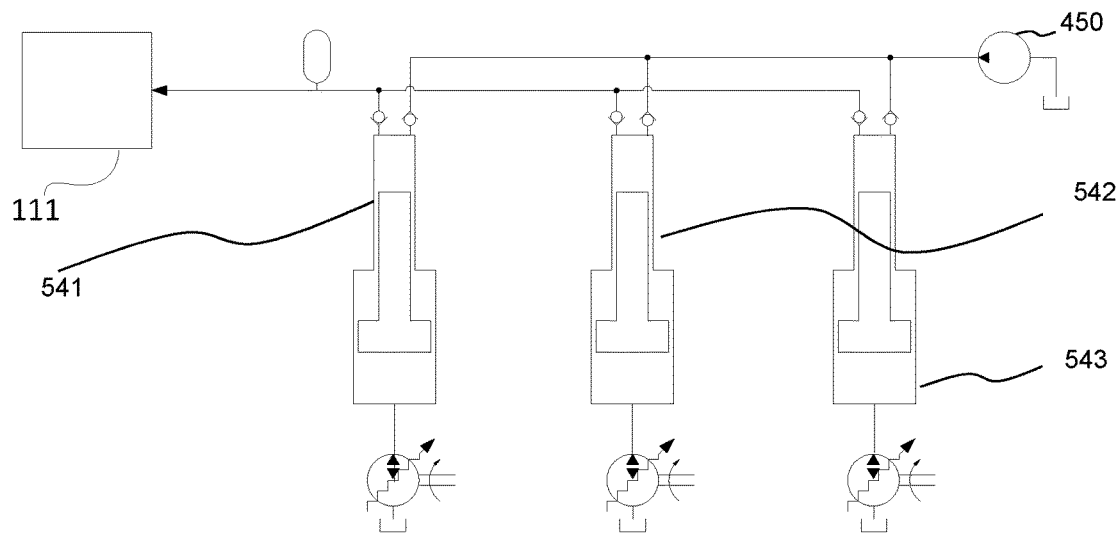
FIG. 42. Is a circuit for a waterjet cutting machine with three synthetically commutated pump/motors, and three intensifier pistons.

With reference to FIG. 42, synthetically commutated pump/motors provide hydraulic flow to pressure intensifiers (541, 542, 543) to move corresponding pistons resulting in a flow of a fluid of preferred embodiment water or any other fluid in ratio to the relative area of the separating piston, check valves allow the water to enter from the low pressure supply output of super charge pump (450) at a preferred pressure from atmospheric to 20 bar check valves allow the water to be expelled from the pressure intensifier (541, 542, 543) as hydraulic fluid is pumped into the pressure intensifier to provide a high pressure source of water at a preferred pressure of 20-10,000 bar. To return the pressure intensifier piston the hydraulic pressure is reduced by activating synthetically commutated pump/motor in motor mode thus recovering stored pressure energy, supercharge pump (450) provides flow to return pressure intensifier pistons to fully retracted position to restart cycle. The preferred embodiment of FIG. 42 is three synthetically commutated pump/motors, three pressure intensifiers and three dump valves, however the system must contain at least one of each with no limit on the total number. Output pressure accumulator may not be required if any one of the synthetically commutated pump/motors command sufficiently reduces output flow variation. The water side supercharge pump typically runs at 100 psi (7 bar) in existing waterjet cutting machines. At 10:1 intensifier ratio, this gives 10 psi on the oil side. Whilst such pressure is low for motoring, it is entirely possible though not ideal, and may require extra pump capacity (e.g. around 20%). Also, there is more time available to retract than extend given a more square flow profile is possible during retraction. The water supercharge pressure can be increased if low pressure motoring is a problem, and this energy can be somewhat recovered. The advantage to three intensifiers is that the water side accumulator is not required which may or may not have a net pay off. These are advantages to both the two and three intensifier concepts.

Figure 43:
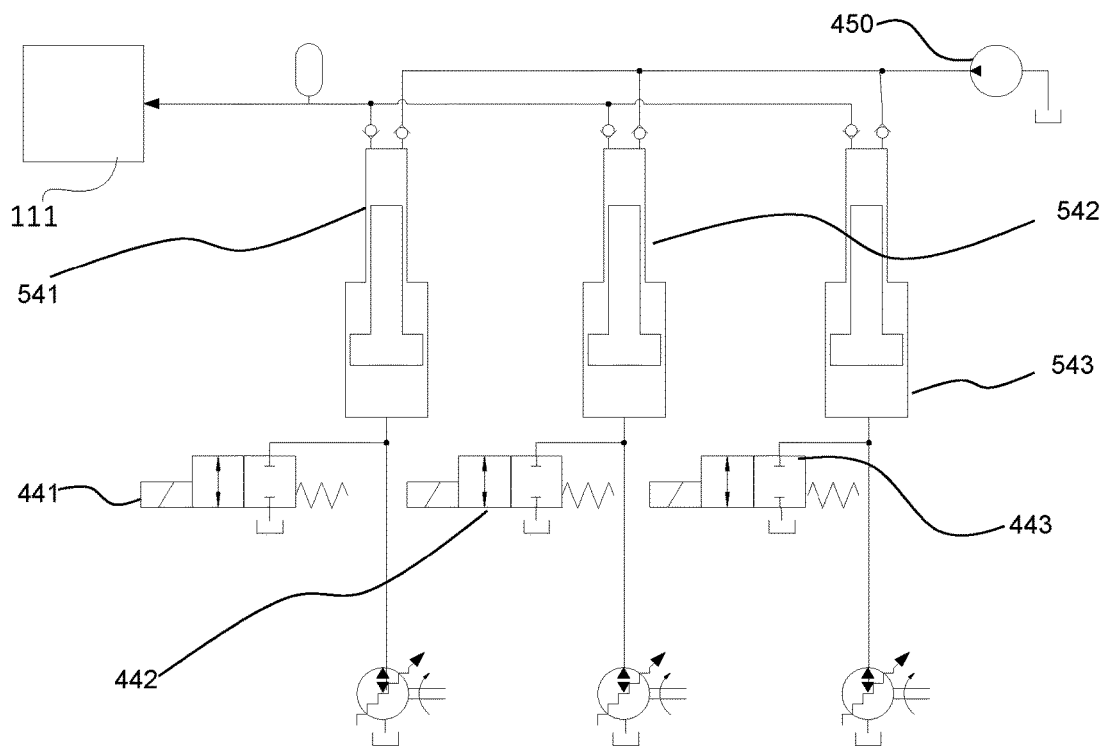
FIG. 43. Is a circuit for a waterjet cutting machine with three synthetically commutated pump/motors, and three intensifier pistons.

With reference to FIG. 43, three synthetically commutated pump/motors respectively provide hydraulic flow to pressure intensifiers (541, 542, 543) to move corresponding pistons resulting in a flow of a fluid of preferred embodiment water or any other fluid in ratio to the relative area of the separating piston. Check valves allow the water to enter from the low pressure supply output of super charge pump (450) at a preferred pressure from atmospheric to 20 bar. Check valves allow the water to be expelled from the pressure intensifiers (541, 542, 543) as hydraulic fluid is pumped into the pressure intensifier to provide a high pressure source of water at a preferred pressure of 20-10,000 bar. To return the pressure intensifier pistons, the hydraulic pressure is reduced by activating synthetically commutated pump/motors in a motor mode thus recovering stored pressure energy. When the hydraulic pressure is reduced sufficiently, valves (441, 442, 443) are energized to provide a high flow path back to the tank, supercharge pump (450) provides flow in order to return pressure intensifier pistons to fully retracted position to restart cycle. The preferred embodiment of FIG. 43 is three synthetically commutated pump/motors, three pressure intensifiers and three dump valves to provide output water flow with minimal flow variation, however the system must contain at least one of each with no limit on the total number. Output pressure accumulator may not be required if the synthetically commutated pump/motors command sufficiently reduces output flow variation.

Figure 44:
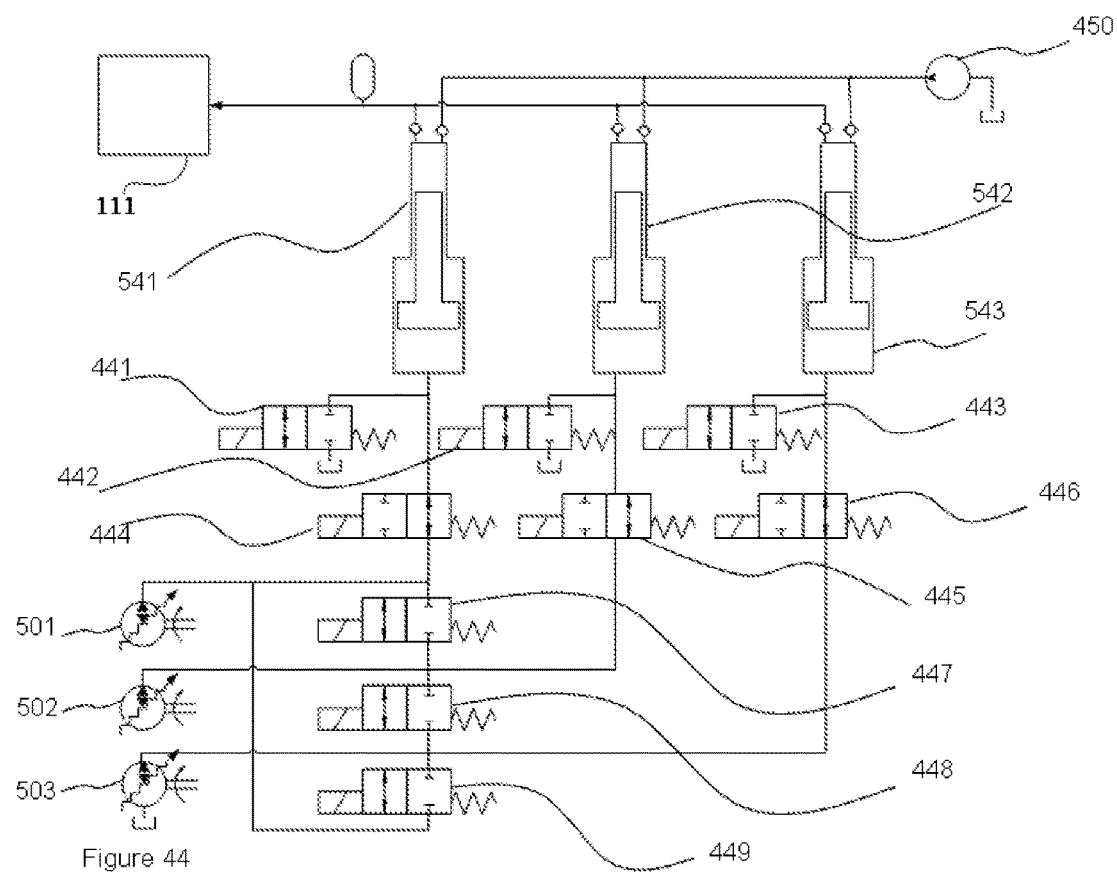
FIG. 44. Is a circuit for a waterjet cutting machine with direct acting three synthetically commutated pump/motors, and three intensifier pistons.

With reference to FIG. 44 three synthetically commutated pump/motors respectively provide hydraulic flow to pressure intensifiers (541, 542, 543) to move corresponding pistons resulting in a flow of preferred working fluid in ratio to the relative area of the separating piston. Check valves allow the water to enter from the low pressure supply output of super charge pump (450) at a preferred pressure from atmospheric to 20 bar. Check valves allow the water to be expelled from the pressure intensifiers (541, 542, 543) as hydraulic fluid is pumped into the pressure intensifier to provide a high pressure source of water at a preferred pressure of 20-10,000 bar. To return the pressure intensifier pistons, the hydraulic pressure is reduced by activating synthetically commutated pump/motors in a motor mode thus recovering stored pressure energy. When the hydraulic pressure is reduced sufficiently, valves (441, 442, 443) are energized to provide a high flow path back to the tank, supercharge pump (450) provides flow in order to return pressure intensifier pistons to fully retracted position to restart the cycle. When one or more of the pressure intensifiers is commanded to be stationary its corresponding pump/motor is idle and does not provide flow, valves (444, 445, 446, 447, 448, 449) when commanded correctly can be used to add the flow from the unused pump to another pressure intensifier. For example if a first pressure intensifier (541) is stationary, a valve (444) is energized to close the flow path from a first pump (501) to first intensifier (541), a further valve (447) is energized opening the flow path from the first pump (501) to second intensifier (542) thus adding the flow of first and second pumps (501, 502) to the second intensifier (542). The preferred embodiment of FIG. 44 is three synthetically commutated pump/motors (501, 502, 503), three pressure intensifiers (541, 542, 543) and three dump valves (441, 442, 443) to provide output water flow with minimal flow variation, however the system must contain at least two of each with no limit on the total number. Output pressure accumulator may not be required if the synthetically commutated pump/motors command sufficiently reduces output flow variation.

Figure 45:
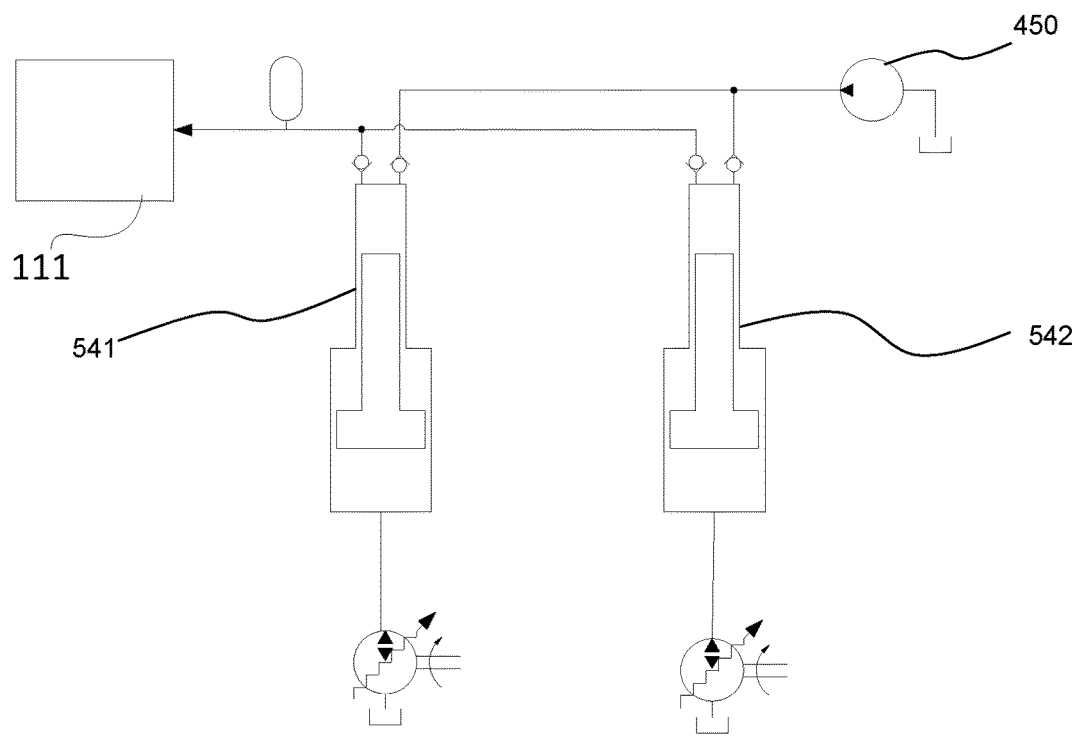
FIG. 45. Is a circuit for a waterjet cutting machine with a pair of synthetically commutated pump/motors, and two intensifier pistons, but no intermediate valves.

FIG. 45 shows an alternate embodiment of FIG. 42, having at least two synthetically commutated pump/motors and at least two pressure intensifiers (451, 452) which seek together to provide low output flow variation. One synthetically commutated pump/motor output is commanded to return one pressure intensifier piston at a greater speed than the other next-in-phase pressure intensifier piston is extended. Approaching the end of the stroke of one intensifier piston, as it slows down the next-in-phase intensifier starts to move, thus taking over as the dominant contributor to the ganged flow and seeks to maintain constant flow. The returning intensifier must return and start moving before the other intensifier is at the end of its stroke. Thus, continuous operation of the system according to FIG. 45 requires that the intensifiers' return strokes are faster than their pressure stroke. This invention ideally seeks to remove the need for an output pressure accumulator (shown) as ideally the ganged output flow has little or no flow variation.

In a variation of the embodiment shown in FIG. 45 having two pressure intensifiers, the system may in include an additional third synthetically commutated pump/motor. The third synthetically commutated pump/motor output (or a third service provided by a synthetically commutated pump/motor) may be used as a sort of selective boost, to supply in addition to one or both of the other two, as required. If the first output/service typically feeds a first intensifier, and a second service output typically feeds a second intensifier, then the third switches between the two in order to maintain uniform ganged output flow from the two intensifiers. During typical operation, as the first intensifier piston approaches TDC (top dead centre), the flow from the second service output is reduced as it is desired to reduce the flow to the first intensifier (second service output may drop to zero). The output from the first intensifier is falling, as the output from the second intensifier is increasing, and in effect the transfer from the first to the second has started. Then, as the second service output has to increase to compensate to maintain the ganged flow from the two intensifiers, the first service may switch or begin to switch to supply the second intensifier. The second intensifier requires supply from the second and third services in order to maintain the uniform flow of the ganged intensifiers. This cycle continues as the first intensifier similarly takes over from the second, and the cycle of switching between sources repeats.

Figure 46:
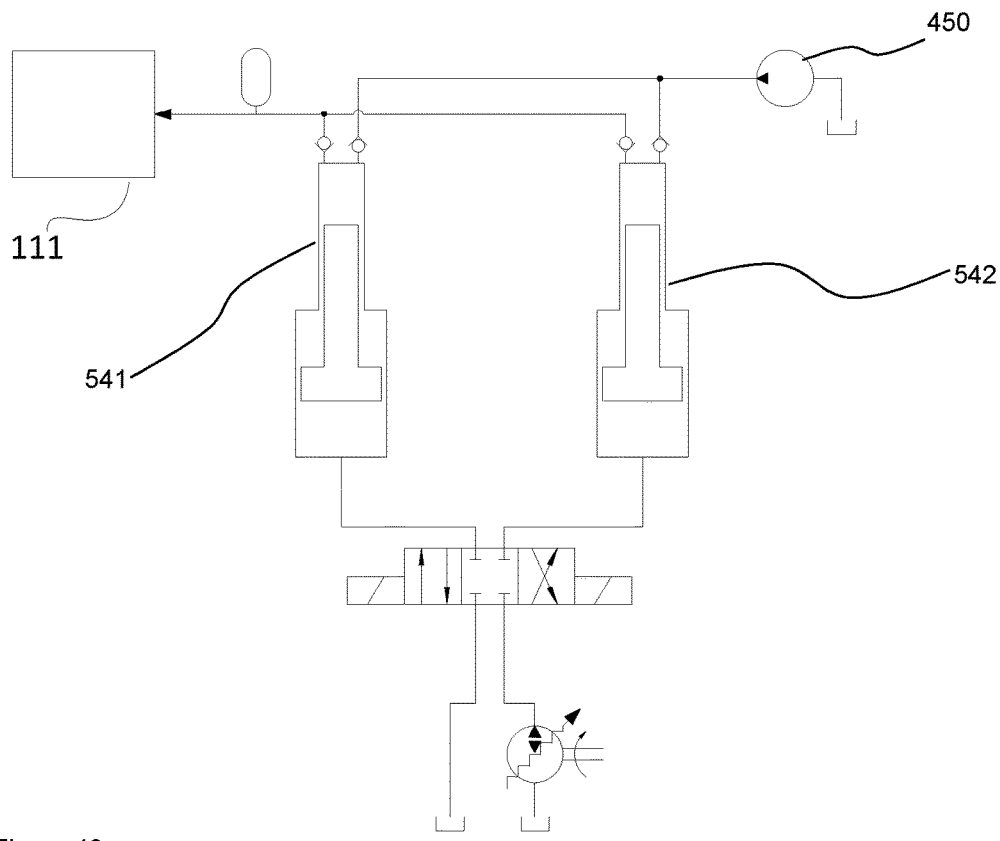
FIG. 46. Is a circuit for a waterjet cutting machine with single synthetically commutated pump/motor, and two intensifier pistons.

FIG. 46 shows an embodiment where the valve diverts flow from a single synthetically commutated pump/motor to a pair of pressure intensifiers (541, 542).

Figure 47:
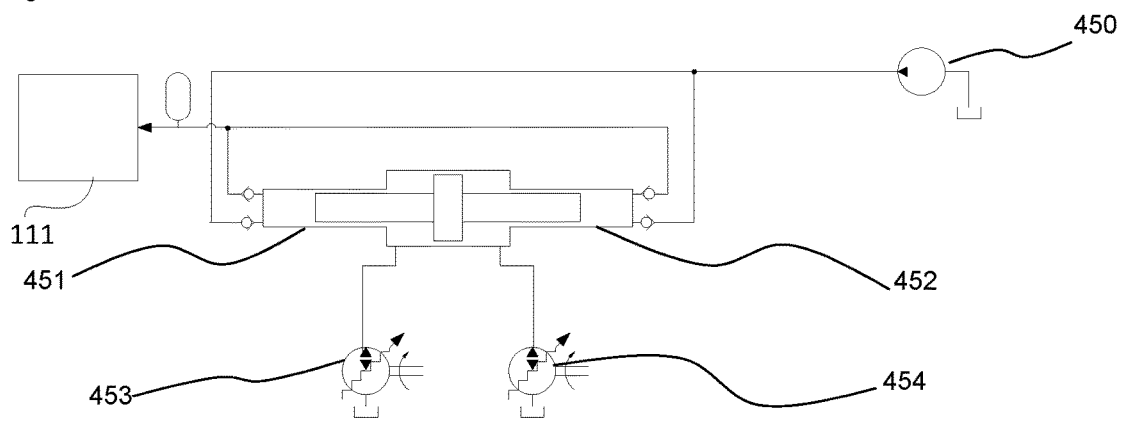
FIG. 47. Is a circuit for a waterjet cutting machine with a pair of synthetically commutated pump/motors, and single positionable intensifier piston.
Figure 48:
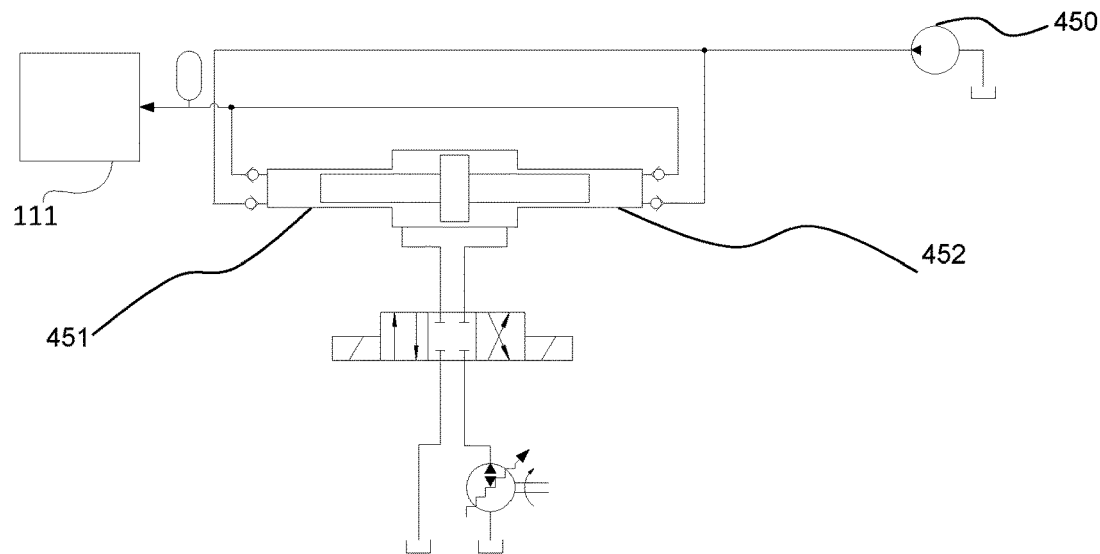
FIG. 48. Is a circuit for a waterjet cutting machine with single synthetically commutated pump/motor, and a single intensifier piston.

FIGS. 47 and 48 show a combination of pressure intensifiers (541, 542) into a single unit, with two ends (451, 452). A single piston instead of two serves to reduce cost and complexity at the expense of increased output flow variation. An advantage is that this design eliminates seals to the outside (between water: oil, and between volumes on the right hand side and the left hand side). The pressure and tank lines may be switched using the changeover valve.

Figure 49:
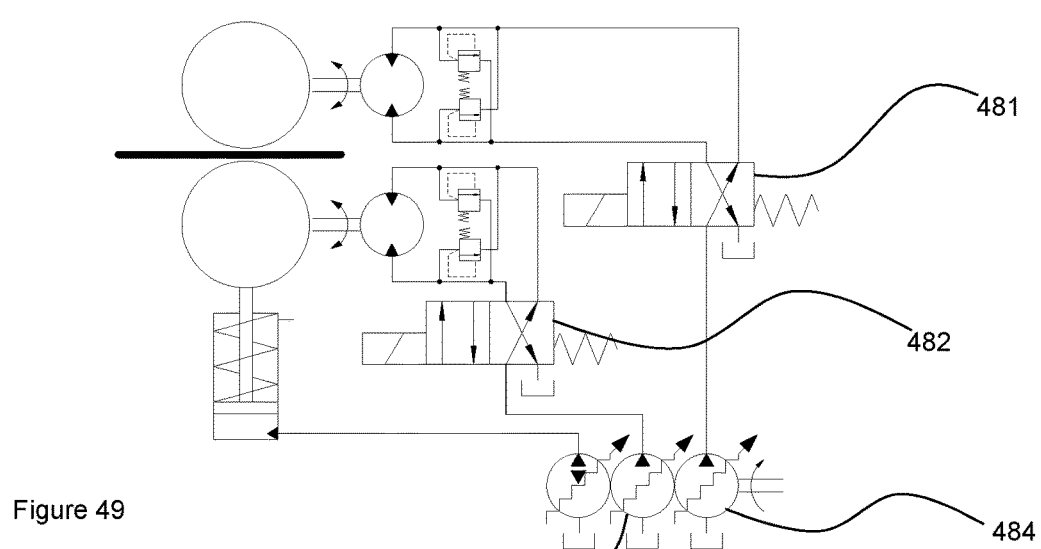
FIG. 49. Is a circuit for a steel mill, comprising two motors for rolling provided with fluid power by two synthetically commutated pumps, and a single synthetically commutated pump/motor for moving a ram for applying pressure with the roller/rollers.

FIG. 49, this arrangement is particularly suited to a steel mill, and in particular to the rolling portion of the mill. At least one of a pair of rollers is driven to rotate by a pair of synthetically commutated hydraulic pumps. One of the rollers may translate under the action of a single acting ram towards and away from the other roller, which has the effect of narrowing/widening the gap between the rollers. The ram is supplied with pressurised working fluid from a synthetically commutated pump/motor. As is common in a steel mill, the working fluid may be chosen to be fire resistant and corrosion resistant, and may for example bean oil and water emulsion, water polymer solution, anhydrous synthetic etc. Further classes/sub-categories include HFAE (fluid with >80% water), HFAS, HFB (water-in-oil emulsion of petroleum oil, emulsifiers, selected additives, water), HFC (solutions of water, glycols, additives, and thickening agents), HFD (non-water-containing fire-resistant fluids), HFDR (as HFD with phosphate esters), HFDU (as HFD with polyol esters or polyalkylene glycols), non-mineral oil, and any fire-resistant hydraulic fluids according to ISO 12922, which may include HWBF's (high Water Based Fluids), HWCF's (High Water Content Fluids), VHWBF's (viscous high-water-based fluids), or even pure water. The primary example environment is a rolling portion of a steel mill, however, the same technology will apply to rolling mills in other industries such as paper processing, rubber processing, printing, food processing, chip and fibre board processing, recycling shredder.

Figure 50:
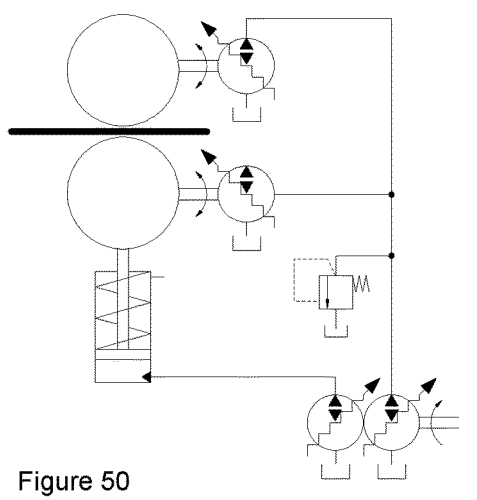
FIG. 50. Is a portion of a steel mill, with four synthetically commutated pump/motors, for steel rolling.
Figure 51:
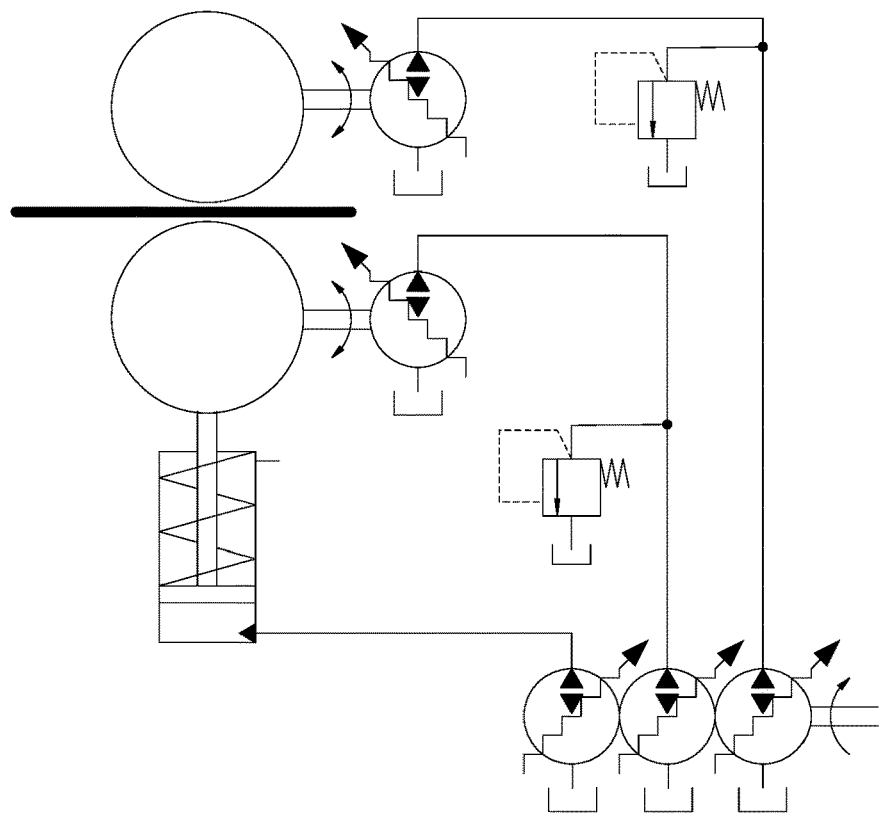
FIG. 51. Is a portion of a steel mill, with five synthetically commutated pump/motors, for steel rolling.
Figure 52:
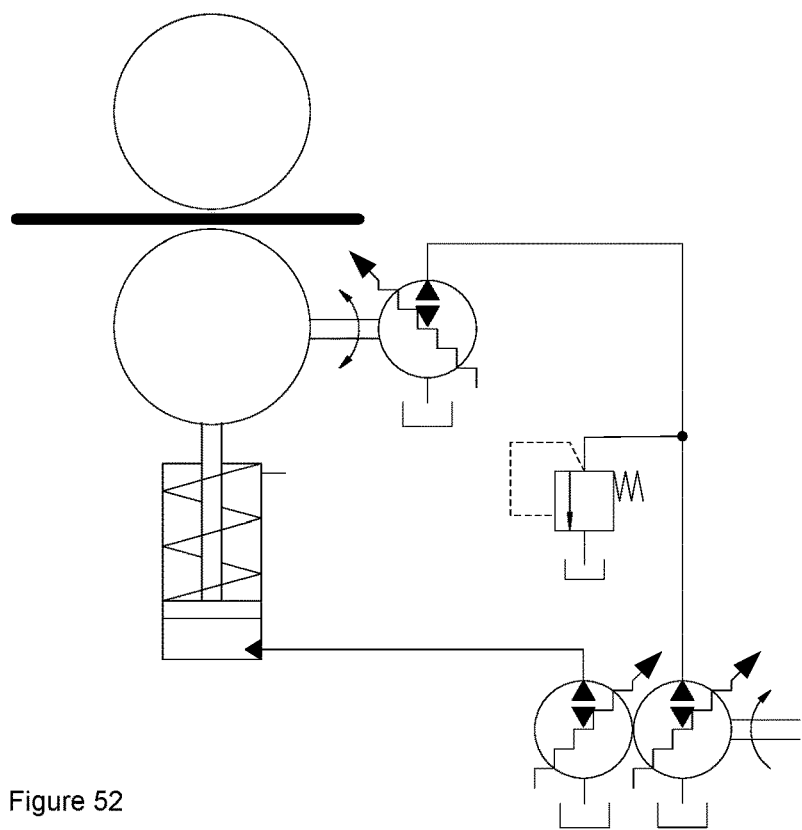
FIG. 52. Is a portion of a steel mill, with three synthetically commutated pump/motors, for steel rolling.

FIG. 49 represents a preferred embodiment where both rollers are driven by individual hydraulic motors, and directional valves (481, 482) control the direction of rotation of the rollers. Two synthetically commutated pumps with independent output flow (483, 484) control the rate of rotation of the rollers independently. Typically the pumps operate to rotate the rollers at equal speed, although the rollers may also operate at different speeds as the application requires. In an alternate embodiment the rollers can be rotated with a synthetically commutated pump motor with flow provided from a single synthetically commutated pump as shown in FIG. 50. This embodiment allows for wider operation of torque and speed and recovers inertial energy of the rotating rollers. As referenced in FIG. 51 each roller synthetically commutated pump motor can be supplied by a dedicated synthetically commutated pump/motor, operating as a pump. Where only one roller is required to be driven a single synthetically commutated pump/motor and synthetically commutated pump/motor can be used as referenced in FIG. 52.

It may be desirable to operate with two working fluids, for example water based fluid for fire resistance and another in the form of hydraulic mineral oil for pump lubrication (other suitable examples are provided elsewhere in document). This can be achieved with separate pressure generators (e.g. intensifiers) to separate the two working fluids. The pressure generators can be of reciprocating piston type as in FIG. 53, the pressure generators may have equal piston area or unequal piston area to either intensify or reduce the pressure. As referenced in FIG. 53 a forging press is operated on two working fluids.

Figure 55:
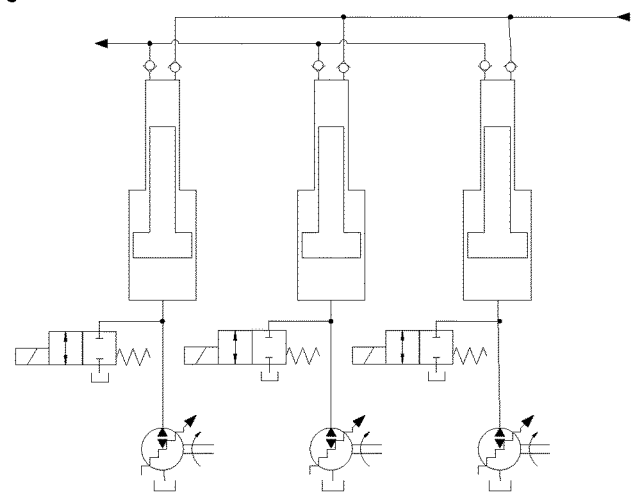
FIG. 55. Is a portion of an oil field, with three synthetically commutated pump/motors coupled to three pressure intensifiers.

It may also be desirable to operate with two working fluids to pump a fluid such as mud or grout as used in well drilling operations. As referenced in FIG. 55 a DDP® pump operates using hydraulic fluid such as mineral oil to provide flow to pressure generators. The pressure generators can be of reciprocating piston type as in FIG. 53 the pressure generators may have equal piston are or unequal piston area to either intensify or reduce the pressure.

Figure 53:
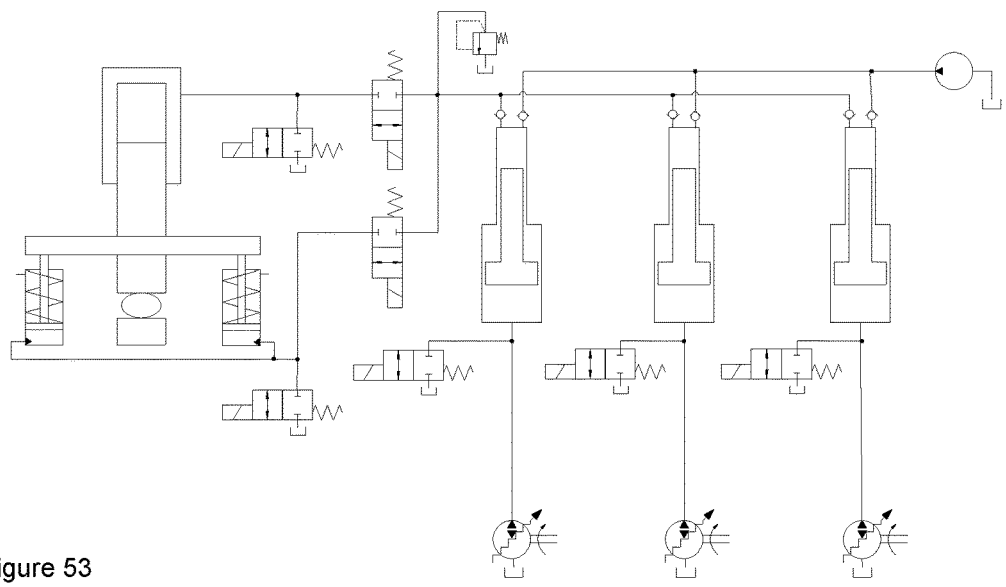
FIG. 53. Is a portion of a steel mill, with three synthetically commutated pump/motors coupled to three intensifiers, for steel forging.
Figure 54:
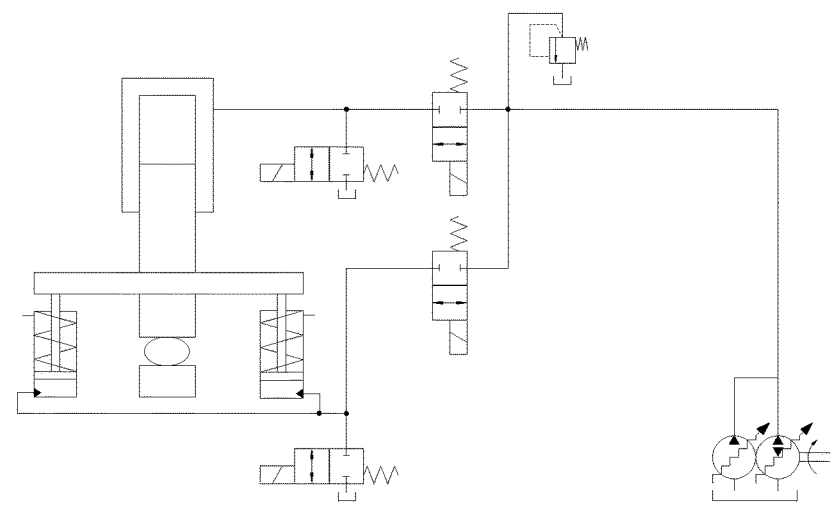
FIG. 54. Is a portion of a steel mill, with one synthetically commutated pump/motor, and one synthetically commutated pump, for steel forging.

Although the FIGS. 53 & 54 illustrate forging of steel, the consumer may instead be replaced with another consumer, such as a cutting or clamping device, especially in a steel mill. Whilst two different working fluids may be used depending on the environmental requirements, it is also possible that both sides of the intensifier piston may run on the same fire and corrosion resistant fluid.

The illustrated examples of synthetically commutated pump and synthetically commutated pump/motor are a radial piston pump, however, the fluid working machine may alternatively be a radial piston motor or a device operable as a pump or a motor in alternative operating modes or conceivably simultaneously (with some working chambers motoring and some working chambers pumping). The fluid working machine may be a fluid working machine which is operable to select the volume to be displaced by working chambers during individual volume cycles on each successive cycle of working chamber volume.

The invention claimed is:

1. An industrial system comprising:
    a hydraulic fluid working machine, a controller for controlling the at least one fluid working machine, at least one fluid consumer and a hydraulic circuit,
    the fluid working machine comprising a plurality of working chambers of cyclically varying volume, a rotatable shaft which rotates in phase with the cyclically varying volume of the plurality of working chambers, each said working chamber operable to displace a volume of working fluid which is selectable by the controller on each cycle of working chamber volume,
    wherein the hydraulic circuit comprises at least first and second fluid retaining bodies,
wherein the fluid circuit directs hydraulic fluid outputted from the fluid working machine to at least one said fluid consumer via the first or second fluid retaining body, and further directs hydraulic fluid from at least one said fluid consumer to the machine via the first or the second fluid retaining body, characterised in that the machine is operable in a pumping mode to supply energy in the form of pressurised fluid flow to at least one said fluid consumer via one of the fluid retaining bodies in order that at least one said fluid consumer may perform work, and the machine is also operable in a regeneration mode operating as a motor such that it receives energy by way of pressurised fluid flow from at least one said fluid consumer via one of the fluid retaining bodies and converts it to fluid working machine shaft torque, and wherein the machine has at least two fluid outputs, whereby the piston cylinder assemblies which provide the drive mechanism of the machine can be dynamically allocated to the fluid outputs such that the fraction of assemblies allocated to each output is variable during machine operation.

2. An industrial system according to claim 1, where at least one of the fluid retaining bodies is hydraulically stiff.

3. An industrial system according to claim 2 where the volume of the at least one fluid retaining body changes, when varying flow between zero flow and operating pressure or high pressure flow either by less than 2%, or the required number of machine piston stroke cycles producing a variation in flow between zero flow and operating pressure or high pressure flow is less than or equal to five.

4. An industrial system according to claim 1, where there is no valve hydraulically intermediate the fluid working machine and one or more said fluid consumer, which would otherwise function to check and/or divert flow, and there is no cross line relief between portions of the circuit.

5. An industrial system according to claim 1, further comprises at least one additional fluid working machine comprising a plurality of working chambers of cyclically varying volume, a rotatable shaft which rotates in phase with the cyclically varying volume of the plurality of working chambers, each said working chamber operable to displace a volume of working fluid which is selectable by a controller on each cycle of working chamber volume, wherein the fluid working machine and the additional fluid working machine are in fluid communication with different fluid consumers.

6. An industrial system according to claim 1 comprising an additional valve located within the circuit to isolate the fluid volumes, where the valve may switch to a position which checks the flow of fluid through at least one of the two fluid volumes.

7. An industrial system according to claim 1 wherein at least one said consumer is a ram, or a hydraulic motor.

8. An industrial system according to claim 7 where the torque arising from at least two cylinders in the machine may be mutually supportive, or the torque may be subtractive.

9. An industrial system according to claim 8, where the fluid working machine is driven by a motor and wherein the controller is programmed to selectively cause at least one working chamber of the fluid working machine to carry out a motoring cycle to enable the power output of the fluid working machine to thereby exceed the power received by the fluid working machine from the motor.

10. An industrial system according to claim 8, where the said motoring cycle is carried out using working fluid received from at least one accumulator, and using some of the piston cylinder assemblies of the fluid working machine to provide a service that provides flow to and from the at least one accumulator.

11. An industrial system according to claim 1, where the machine is a synthetically commutated pump-motor that may function as a pump and/or a motor.

12. An industrial system according to claim 11 where the machine additionally comprises working chambers which are mechanically commutated.

13. An industrial system according to claim 1, where a hydraulic accumulator is fluidly connected or (typically selectively) connectable to at least one said fluid retaining bodies between the machine and the consumer, in order to (optionally selectively) provide a source of hydraulic compliance.

14. An industrial system according to claim 1, further comprising a plurality of manifolds, where the machine comprises a plurality of valves, each of which is operable to regulate the flow of fluid between a working chamber of the machine and at least one of the manifolds.

15. An industrial system according to claim 1 which is an injection moulding machine.

16. An injection moulding machine according to claim 15, wherein at least one said fluid consumer is a motor configured to rotate a screw member in a barrel for injecting moulding material into a mould cavity.

17. An injection moulding system according to claim 16 where the fluid consumer is coupled to said injection unit for translating said screw in a barrel pursuant to a variable translate command signal.

18. An injection moulding machine according to claim 15, where the consumer is a ram configured to actuate a clamp unit for supporting first and second sections of a mould selectively movable from a parted position in which said mould sections are opened to a moulded position in which the mould sections are closed to define said mould cavity therebetween.

19. An injection moulding system according to claim 18 where the fluid consumer is an ejection ram, injection unit translating ram or rotating motor, tie-bar clamp ram, or any hydraulic consumer in the function of an injection moulding system.

20. An industrial system according to claim 1 which is a water jet cutting machine.

21. A water jet cutting machine according to claim 20, comprising at least two fluid working machines and at least two said fluid consumers being pressure intensifiers (451, 452) with ganged outputs, one fluid machine output is commanded to return one pressure intensifier piston at a greater speed than the other next-in-phase pressure intensifier piston is extended, where towards the end of the stroke of one intensifier, as it slows down the next-in-phase intensifier starts to move, thus taking over as the dominant contributor to the ganged flow in order to maintain constant flow, the returning intensifier must return and start moving before the other intensifier is at the end of its stroke.

22. A water jet cutting system according to claim 20 wherein at least one said fluid consumer is a pressure intensifier.

23. A kit of parts which can be assembled to form an industrial system according to claim 1.

24. A method of controlling an industrial system according to claim 1, where pressure control of the machine is used.

25. A method of controlling an apparatus according to claim 1, where flow control of the machine is used.

26. A method of controlling an industrial system according to claim 1, where feed forward control of the fluid working machine is used.

27. A method of controlling an industrial system according to claim 1, where variable power control or variable power limit control of the fluid working machine is used.

28. A method of controlling an industrial system according to claim 1, comprising dynamically allocating the piston cylinder assemblies to the fluid outputs to vary the fraction of assemblies allocated to each output during machine operation.

\* \* \* \* \*